(12) United States Patent
Iyer

(10) Patent No.: US 11,994,095 B2
(45) Date of Patent: May 28, 2024

(54) SYSTEM AND METHOD FOR MAGNETIC MOTION TRANSFER IN WAVE ENERGY SYSTEMS

(71) Applicant: Narayan R Iyer, Iowa City, IA (US)

(72) Inventor: Narayan R Iyer, Iowa City, IA (US)

(*) Notice: Subject to any disclaimer, the term of this patent is extended or adjusted under 35 U.S.C. 154(b) by 81 days.

(21) Appl. No.: 17/664,415

(22) Filed: May 22, 2022

(65) Prior Publication Data
US 2022/0372947 A1    Nov. 24, 2022

Related U.S. Application Data

(63) Continuation-in-part of application No. 17/388,559, filed on Jul. 29, 2021, now Pat. No. 11,649,801.

(60) Provisional application No. 63/264,370, filed on Nov. 21, 2021, provisional application No. 63/203,091, filed on Jul. 7, 2021, provisional application No. 63/202,840, filed on Jun. 25, 2021, provisional application No. 63/202,510, filed on Jun. 14, 2021, provisional application No. 63/202,013, filed on May 23, 2021.

(51) Int. Cl.
*F03B 13/16*    (2006.01)

(52) U.S. Cl.
CPC ........ *F03B 13/16* (2013.01); *F05B 2220/706* (2013.01)

(58) Field of Classification Search
CPC .......... F16D 41/12; G01F 15/07; F16H 1/003; F16H 1/06; F16H 29/16; F16H 55/17; F16H 29/22; F16H 2055/178; F16H 1/006; F17C 1/007; F17C 2221/031; F17C 2223/0123; F17C 2227/0372; F17C 2270/0147; F17C 2270/0581
See application file for complete search history.

(56) References Cited

U.S. PATENT DOCUMENTS

| | | | | |
|---|---|---|---|---|
| 3,814,962 | A * | 6/1974 | Baermann | H02K 49/102 310/103 |
| 2017/0045119 | A1* | 2/2017 | Rodriguez Ramirez | F03B 13/142 |
| 2018/0156312 | A1* | 6/2018 | Wang | G01F 15/07 |

FOREIGN PATENT DOCUMENTS

| | | | |
|---|---|---|---|
| CN | 108071769 A | * | 5/2018 |
| JP | 2016200228 A | * | 12/2016 |

OTHER PUBLICATIONS

English Translation CN-108071769-A (Year: 2018).*
English Translation JP-2016200228-A (Year: 201).*

* cited by examiner

*Primary Examiner* — Shafiq Mian

(57) ABSTRACT

The present disclosure provides a system and method of producing unidirectional motion from a multidirectional source using magnets strategically placed to reduce the necessity of some physically interacting parts. Smoothened unidirectional motion can accomplish usable work in many applications.

21 Claims, 26 Drawing Sheets

SYSTEM AND METHOD FOR MAGNETIC MOTION TRANSFER IN WAVE ENERGY SYSTEMS

CROSS REFERENCE TO RELATED APPLICATIONS

This application is a non-provisional patent application which claims the benefit of six U.S. provisional patent applications: having Ser. No. 63/202,013, which was filed on May 23, 2021; having Ser. No. 63/202,510, which was filed on Jun. 14, 2021; having Ser. No. 63/202,840, which was filed on Jun. 25, 2021; having Ser. No. 63/203,091, which was filed on Jul. 7, 2021; having Ser. No. 63/262,636, which was filed on Oct. 17, 2021; and having Ser. No. 63/264,370, which was filed on Nov. 21, 2021; all of these provisional applications are incorporated herein in their entirety by this reference.

This application is a continuation-in part of U.S. patent application Ser. No. 17/388,559, filed Jul. 29, 2021. This application is incorporated herein in its entirety by this reference.

FIELD OF THE INVENTION

In an Ocean environment, human tasks become significantly more difficult. Performing maintenance to a wave energy device in the Ocean is extremely difficult. The current invention strives to reduce the frequency of maintenance activities by using magnetic methods in intricate and easily wear-able components of a wave energy system. In particular, the present invention explores magnetic methods and its potential in alternating-to-direct motion converter (ADMC) mechanisms and subsequent storage of unidirectional motion produced by said ADMCs. Smoother unidirectional motion is more favorable for input into a generator in terms of efficiency than alternating motion. The selective motion transfer mechanism and/or ADMC can also be used in a land vehicle traversing uneven terrain to capture and store energy.

BACKGROUND OF THE INVENTION

In the past, many power generation methods have been proposed which involve using oceanic wave motion. One system is described in U.S. Pat. No. 9,995,269 issued to Sung et al on Jun. 12, 2018. One shortcoming of this system is that it uses a motion conversion mechanism that is highly intricate to manufacture, with a variety of moving and physically interacting materials, leading to increased inefficiency, mechanical wear and maintenance burdens, especially in an ocean environment where salt accumulation, biofouling, corrosion and maintenance accessibility are additional challenges. Magnetic force transfer would reduce the effects of stated challenges due to the reduction in physically interacting parts and reduced contact-based material wear fatigue In the past, numerous methods have been attempted to process multidirectional oceanic motion to unidirectional motion into a generator by allowing transmission of a single direction of source motion (such as buoy heave in one direction), and blocking the other direction (reverse buoy motion) from being transmitted. Such mechanisms do not convert a bi-directional source motion into a unidirectional motion, but rather block one such direction of motion from being transmitted, and although such mechanisms are a form of selective motion transfer, they are not considered ADMCs as defined herein. ADMCs are such mechanisms that convert both directions of an alternating motion to a unidirectional motion.

Previous attempts for ADMCs have been overly complex to manufacture with several sub-components, intricate designs, or excessive physically interacting parts susceptible to higher contact friction, mechanical fatigue and decreased efficiency. One such mechanism is comprised in the U.S. Pat. No. 9,995,269 issued to Sung et al on Jun. 12, 2018. Therefore, a need persists to provide efficient, reliable, motion rectification with minimal maintenance requirements. The present invention would efficiently accomplish the task of converting bidirectional motion extracted from ocean waves into a consistent, unidirectional motion for energy generation and/or desalination.

The present invention conveys both: first an efficient means for selective motion transfer, accomplished at least in part by magnetics, and secondly an extension of said means for selective motion transfer, to form an ADMC (also referred to interchangeably as "motion rectifier").

The present invention also conveys means by which the resulting unidirectional motion from selective motion transfer may be stored efficiently in a flywheel comprising magnetic bearings to reduce friction and maintenance cycles.

The present invention may also be used outside the scope of the wave energy industry, and may be utilized in land vehicles traversing uneven terrain in which alternating motion is faced in the suspension system. A magnetic motion rectifier may make use of this alternating motion to generate energy to be used in the vehicle's electronics systems, to recharge an electric battery, and more.

SUMMARY OF THE INVENTION

It is an object of the present invention to provide efficient, selective motion transfer between a source and a sink body, using magnetic components. Wherein selective motion transfer refers to transferring motion between source and a sink body when the source body moves in a first direction, but not transferring motion when the source body moves in a second direction; this allows for the production of unidirectional motion from a multi directional source.

It is an advantage of the present invention to provide for low-maintenance and low-friction systems for use in an Ocean environment.

It is a feature of the present invention to provide an interface between said source and sink bodies, said interface comprising magnetic sub-bodies such as magnetic unidirectional collapsible teeth, that collapse when forced in a first direction to inhibit motion transfer between source and sink bodies, but remain erect to facilitate motion transfer when forced in a second direction.

It is another feature of the present invention to provide means for magnetic re-erection of magnetic unidirectional sub-bodies (teeth) after a collapse has occurred.

It is another advantage to allow for avoidance of design, development and maintenance complications inherent with a need to use torsional or elastic forces to re-erect the sub-bodies (collapsible teeth).

It is a feature of the present invention to provide a mechanism, comprising selective motion transfer, to capture both directions of a bidirectional movement for conversion to unidirectional motion, at least in part by means of magnetic force, with said mechanism referred to as a "Magnetic Alternating to Direct Motion Converter" (Magnetic ADMC), or equivalently "Magnetic Motion Rectifier".

It is another advantage of the present invention to extract more motion by converting both directions of a bidirectional movement to unidirectional motion using an Alternating to Direct Motion Converter (ADMC).

It is another advantage of the present invention to reduce friction and/or mechanical wear within selective motion transfer mechanisms and/or motion rectifiers by incorporating magnetic components.

It is another feature of the present invention to transfer the resulting unidirectional motion to a flywheel comprising magnetic bearings to minimize friction.

It is an object of the present invention to transfer unidirectional motion to an electric generator for electricity generation.

It is an object of the present invention to convert multidirectional motion from a water body to unidirectional motion using an at least partially magnetic motion rectifier.

It is another feature of the present invention to provide a method of energy conversion, by converting alternating motion to unidirectional motion, utilizing at least one magnetic one-way clutch with magnetically forced re-erection of a collapsible sub-body (sprag or tooth) that locks the clutch when forced in one direction, but does not lock when forced in an opposite direction.

It is another object of the present invention to provide a regenerative suspension system in land vehicles traversing uneven terrain using at least one of a magnetic selective motion transfer mechanism and a magnetic motion rectifier.

It is a feature of the present invention to provide a method of generating energy from the extraction of oceanic motion through providing an at least partially submerged buoyant body, an at least partially-magnetic motion rectifier, and transmitting rectified motion to a flywheel comprising at least partially magnetic bearings.

It is a feature of the present invention to provide magnetic shielding material to mitigate magnetic interference among magnetic components.

It is a feature of the present invention to provide passive magnetic decoupling at moments when external forces on a wave energy system surpass stress limits of any components of said system.

The present invention is an apparatus and system for magnetically transferring motion in a selective manner which is designed to satisfy the aforementioned needs, provide the previously stated objects, include the above-listed features, and achieve the already articulated advantages. The present invention is carried out in accordance with the claims, in a sense that magnetic forces are involved in stated transfer of force and motion.

Accordingly, the present invention is a method of producing unidirectional motion from multidirectional motion for at least one of energy conversion, energy storage and desalination, the method comprising the steps of:
  providing a source body that can undergo multidirectional motion;
  providing a sink body;
  providing at least one sub-body that, at least in part, forms an interface between the source body and the sink body;
  wherein any of the at least one sub-body comprises a net magnetic dipole property;
  wherein each of the at least one sub-body;
    moves to a first state when pushed in a first direction relative to the sub-body;
    wherein said first state is a state in which the sub-body does not substantially transfer motion from the source body to the sink body;
    can undergo state transition from a first state to a second state; and
    wherein the second state is a state in which the sub-body substantially transfers motion from the source body to the sink body when said sub-body is pushed in a second direction relative to the sub-body;
  providing at least one magnet (202—FIG. 3, 200—FIG. 3) that interacts with the net magnetic dipole property comprised in any of the at least one sub-body; and
  transmitting a unidirectional motion from the sink body to at least one of an energy storage apparatus, a hydraulic pump; and an electric generator for the generation of electricity.

Additionally, the present invention is an apparatus that produces unidirectional motion from multidirectional motion for at least one of energy conversion, energy storage and desalination, the apparatus comprising:
  a source body that can undergo multidirectional motion;
  a sink body;
  at least one sub-body that, at least in part, forms an interface between the source body and the sink body;
  wherein any of the at least one sub-body comprises a net magnetic dipole property;
  wherein each of the at least one sub-body
    is configured to move to a first state when pushed in a first direction relative to the sub-body;
    wherein said first state is a state in which the sub-body does not substantially transfer motion from the source body to the sink body;
    can undergo state transition from a first state to a second state; and
    wherein the second state is a state in which the sub-body substantially transfers motion from the source body to the sink body when pushed in a second direction relative to the sub-body;
  at least one magnet (202—FIG. 3, 200—FIG. 3) that interacts with the net magnetic dipole property comprised in any of the at least one sub-body; and
  at least one of an energy storage mechanism, a hydraulic pump; and an electric generator for the generation of electricity.

Additionally, the present invention is an apparatus that produces unidirectional motion from multidirectional motion for at least one of energy conversion, energy storage and desalination, the apparatus comprising:
  a buoyant body at least partially submerged in a body of water;
  a first body;
  a second body;
  wherein any of said first body and second body is configured to undergo substantially multidirectional motion;
  at least one sub-body that is connected with said first body in a manner to allow an at least one degree of freedom of the sub-body with respect to the first body;
  wherein each of the at least one sub-body comprises a greater physical limitation on one side of said sub-body compared to the opposite side of said sub-body;
  wherein each of the at least one sub-body
    collapses when pushed in a first direction relative to the sub-body; and
    remains erect when pushed in a second direction relative to the sub-body;
  wherein the at least one sub-body comprises a net magnetic dipole property;
  at least one magnetic body (202—FIG. 3) composed in the first body that interacts with the net magnetic dipole of any of the at least one sub-body to erect the sub-body from a collapsed state to an erect state.

at least one of an energy storage mechanism, a hydraulic pump; and an electric generator for the generation of electricity, that receives substantially unidirectional motion.

Additionally, the present invention is a method of energy conversion from water waves comprising the steps of:

providing a buoyant body that is at least partially submerged in a water body;

converting multidirectional motion to unidirectional motion using at least one of:
 a selective motion transfer mechanism; and
 a motion rectifier (comprising selective motion transfer);

transmitting unidirectional motion to a flywheel; and providing at least partially magnetic bearings to support said flywheel, wherein the magnetic repulsion is used to provide said support.

A method of preventing the transfer of an excess of an at least one of torque and force within a wave energy converter, the method comprising the steps of:

providing a buoyant body; and providing magnetic coupling between movable components, with said coupling being effective only at a range, of at least one of force and torque, at which each of the components affected by said at least one of torque and force, undergo stress below at least one of a fatigue endurance limit;

a fatigue strength defined at the operational life of the wave energy converter; and a fatigue strength defined at the operational life of the component.

BRIEF DESCRIPTION OF THE DRAWINGS

The invention may be more fully understood by reading the description of the preferred embodiments of the invention, in conjunction with the appended drawings wherein.

DETAILED DESCRIPTION

Although described with particular reference to oceanic wave motion extraction, the systems and methods of the present invention could be implemented in other applications including land vehicles. The details below should be viewed as examples of many potential variations of the present invention which are protected hereunder.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any one or any combinations of one or more of the associated listed items. As used in this paper, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Introduction

Figure 1:
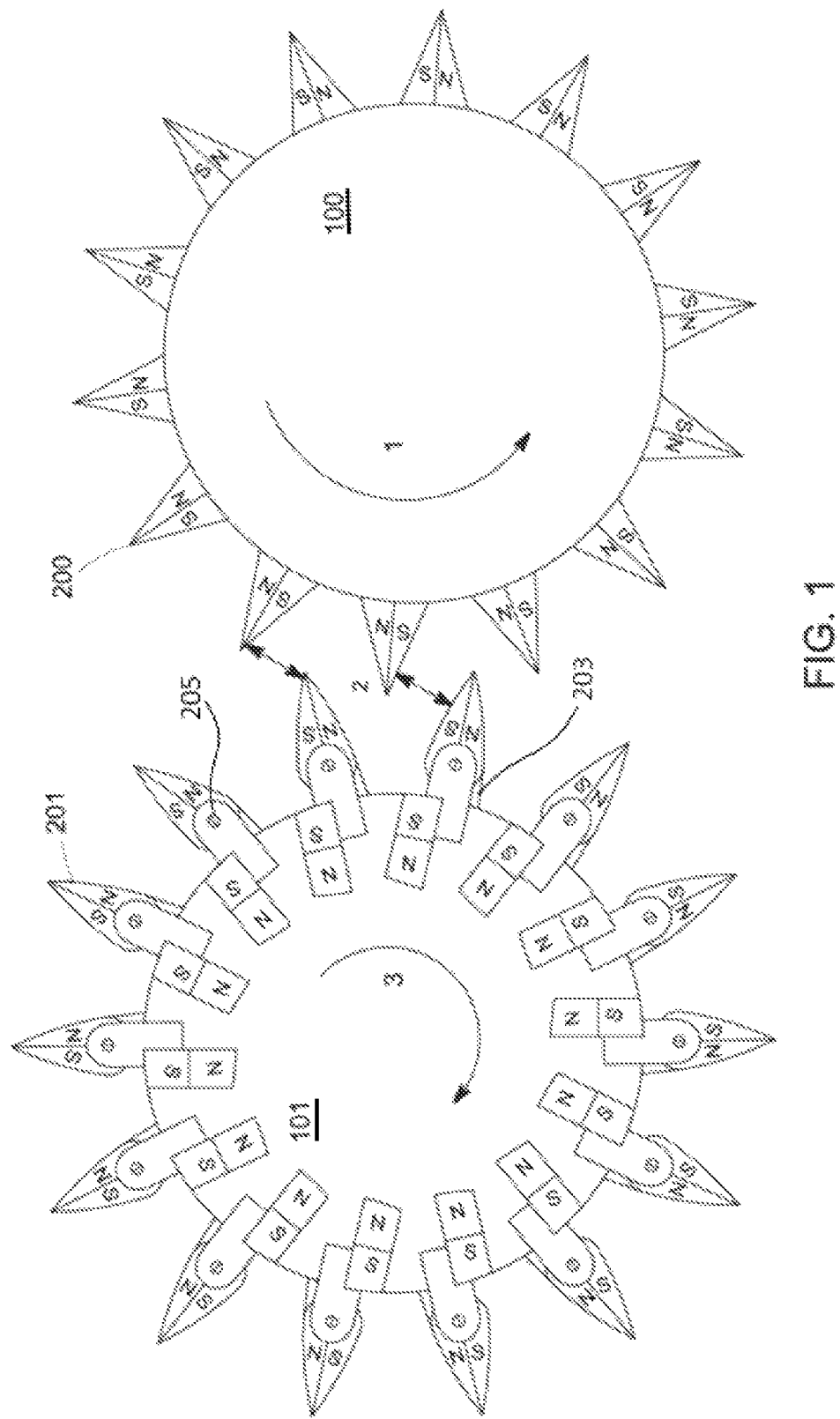
FIG. 1 is a view of one embodiment of a magnetic selective motion transfer mechanism, comprising a source gear and a sink gear, the sink gear comprising magnetic unidirectional collapsible teeth. The scenario depicted shows motion transfer via erect teeth.

The present invention is a method and related apparatus for magnetically converting alternating motion to unidirectional motion; minimizing physical contact, component fatigue and friction between moving parts. An advantage of the present invention is to minimize maintenance requirements of wave energy converters (WECs) while increasing efficiency in energy generation through motion rectification and reducing physical component contact. The present invention may also be utilized in a land vehicle traversing an uneven terrain, thus generating more usable unidirectional motion. The features of this invention and its applications may be grouped into the following:

Magnetic Selective Motion Transfer
Magnetic Motion Rectification (Magnetic ADMC)
Clutch Bearings
Additional Applications-Land Usage, Over-Torque, Magnetic Bearings Now referring to FIG. 1, there is shown a view of the present invention representative of magnetic, selective motion transfer between a source body 100 and a sink body 101.

Selective Motion Transfer

Magnetic selective motion transfer refers to the transfer of motion or substantial lack thereof, from a source body to a sink body based on the direction of motion of the source body, facilitated in part by magnetic forces. In some embodiments, such as the preferred embodiment, a source body is one that experiences bidirectional motion, a sink body is one that selectively receives motion from the source body. For example, the embodiment displayed in FIG. 1 comprises a source gear 100 with rigidly attached magnetic gear teeth 200 and a sink gear 101 with rotationally attached magnetic gear teeth 201, herein also referred to as "magnetic unidirectional collapsible teeth" and "magnetic collapsible teeth" interchangeably. Each rotationally attached magnetic tooth 201 on the sink gear 101 rotates about corresponding revolute joints 205. The magnetic teeth present on both bodies are configured such that similar magnetic poles on the teeth, 201 and 200, of opposite bodies 101 and 100 are the predominant facilitators of force transfer between said bodies. For example, as the source gear 100 rotates, the like poles of source teeth 200 approach like poles on teeth 201 of the sink gear 101, resulting in a net repulsive force among interacting teeth. The term "interacting teeth" and/or "interacting" in the context of teeth herein refers to teeth from one body that are facing substantial forces from the teeth of the other body.

FIG. 1 shows a front view of one embodiment of the present invention, wherein the source body 100 and sink body 101 are both gears, and the sub-bodies are teeth. When the source gear 100 moves in a first direction (counterclockwise in this embodiment), the rigid teeth 200 of the source gear 100 exert net repulsive forces 2 onto the collapsible teeth 201 of the sink gear 101. For said source body movement in the first direction 1, the collapsible teeth 201 remain erect due to the presence of collapse blockers 203 in said direction of motion and allow the transfer of motion 1 from the source body 100 to the sink body 101, resulting in substantial sink body motion 3.

Figure 2:
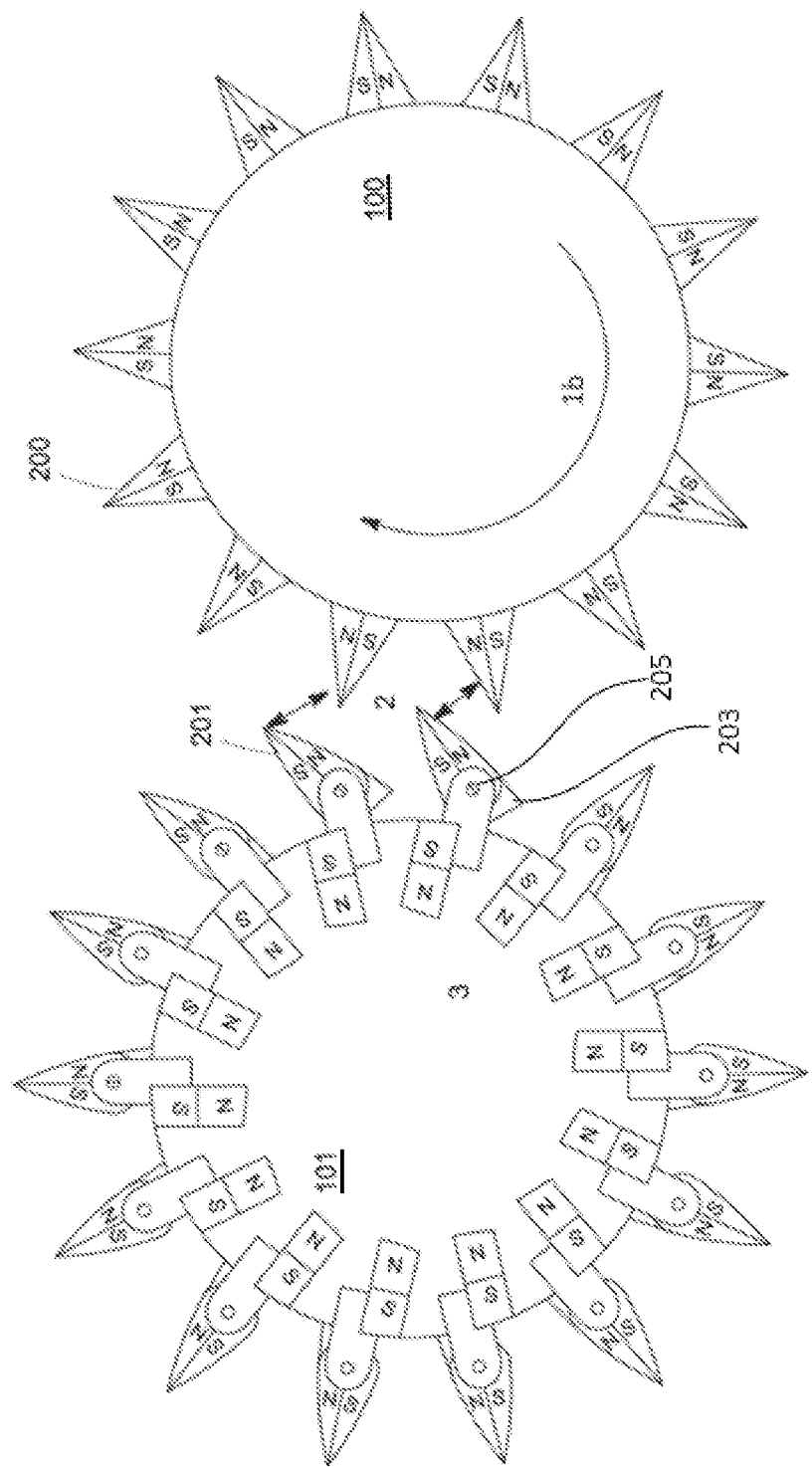
FIG. 2 is the same embodiment of FIG. 1, but depicting a scenario where there is a substantial lack of transfer of motion from the source body to the sink body due to collapsing unidirectional collapsible teeth.

FIG. 2 shows a front view of the same embodiment as FIG. 1, but wherein the source body 100 moves in a second direction 1b, the resulting net repulsive force 2 causes the collapse of the magnetic collapsible teeth 201 due to the lack of collapse blockers 203 in said direction, wherein collapse is the rotation about corresponding revolute joints 205, leading to the substantial lack of motion transfer 3 between the source body 100 and the sink body 101.

Figure 3:
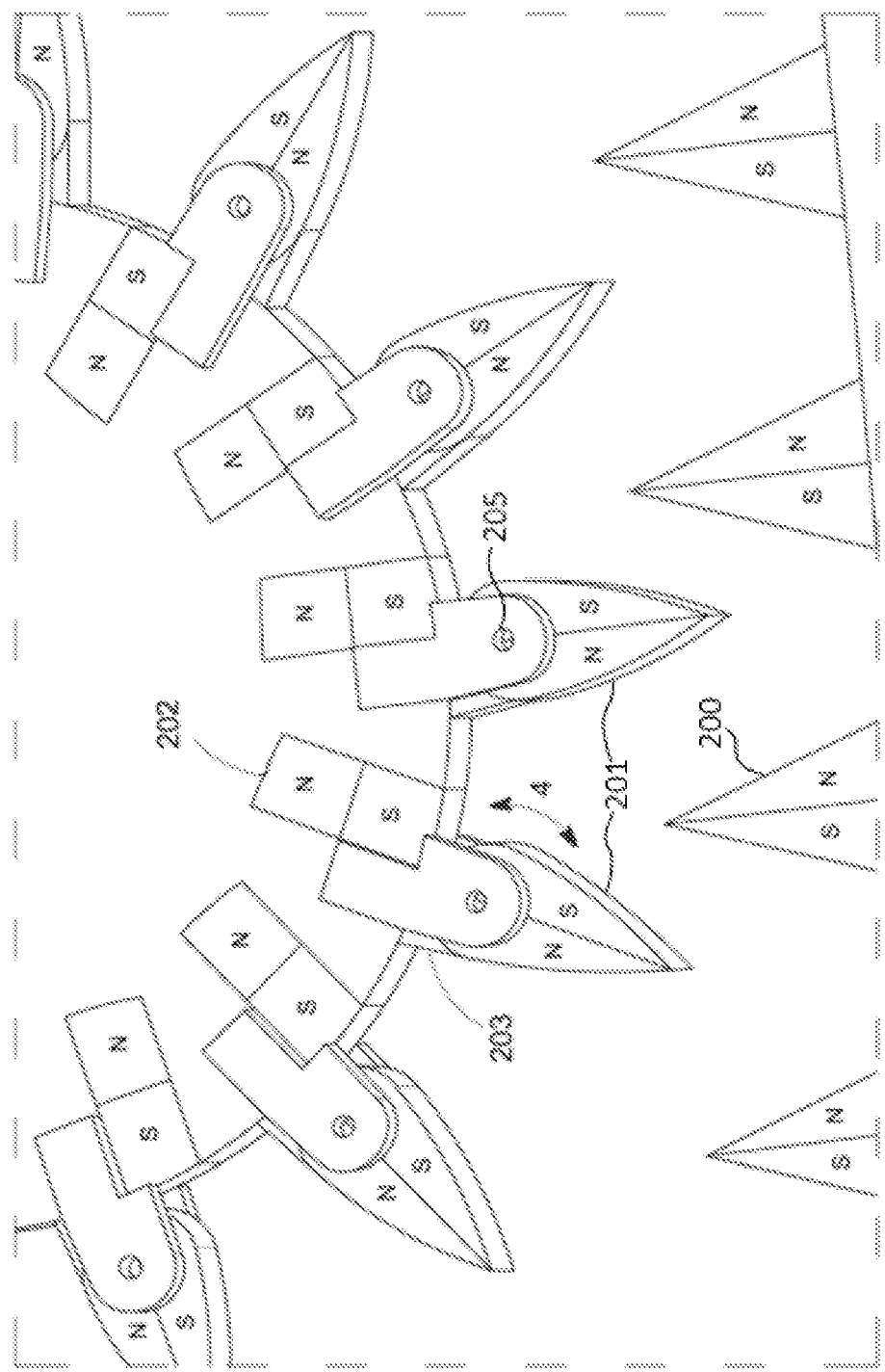
FIG. 3 is a close-up view of the present invention, wherein a magnetic source for erectile force 202 is shown on one side of a collapsible magnetic tooth, and a collapse-blocking physical limiter 203 is shown on the other side thereof.

FIG. 3 shows a closeup front view of the embodiments in FIGS. 1 and 2 to illustrate the working of the collapsible teeth. Each collapsible tooth 201 has collapse blockers 203 only on one side of said tooth to prevent it from collapsing when an adjacent rigid tooth 200 forces the collapsible teeth 201 toward said side. Collapse blockers 203 are physical limiters that prevent the occurrence of tooth collapse. However if the rigid tooth 200 pushes collapsible teeth 201 in the opposite direction, no collapse blockers will prevent collapse, and collapsible tooth 201 collapses. Once any collapsed collapsible tooth 201 stops encountering substantial forces from the rigid teeth 200, either due to the source body 100 slowing down and/or changing direction, and/or due to collapsible teeth 201 becoming out of range from the rigid teeth forces, an erectile magnet 202 on the sink gear causes erectile force 4 to allow the re-erection of said collapsed sink tooth 201. The erectile magnet on the sink gear also facilitates maintenance of the erection of the collapsible tooth in the absence of collapse causing forces of the source gear rigid teeth 200. In some embodiments, especially the preferred embodiment, this erectile magnet on the sink gear is weaker than the rigid source teeth magnet but strong enough to oppose the sink teeth weight. The erectile magnets also will oppose any collapse due to attractive forces between consecutive sink teeth.

A collapse blocker 203 may be any of: a physical limiting volume composed on the body comprising the corresponding collapsible tooth and a physical limiting volume composed on the collapsible tooth itself.

Figure 4:
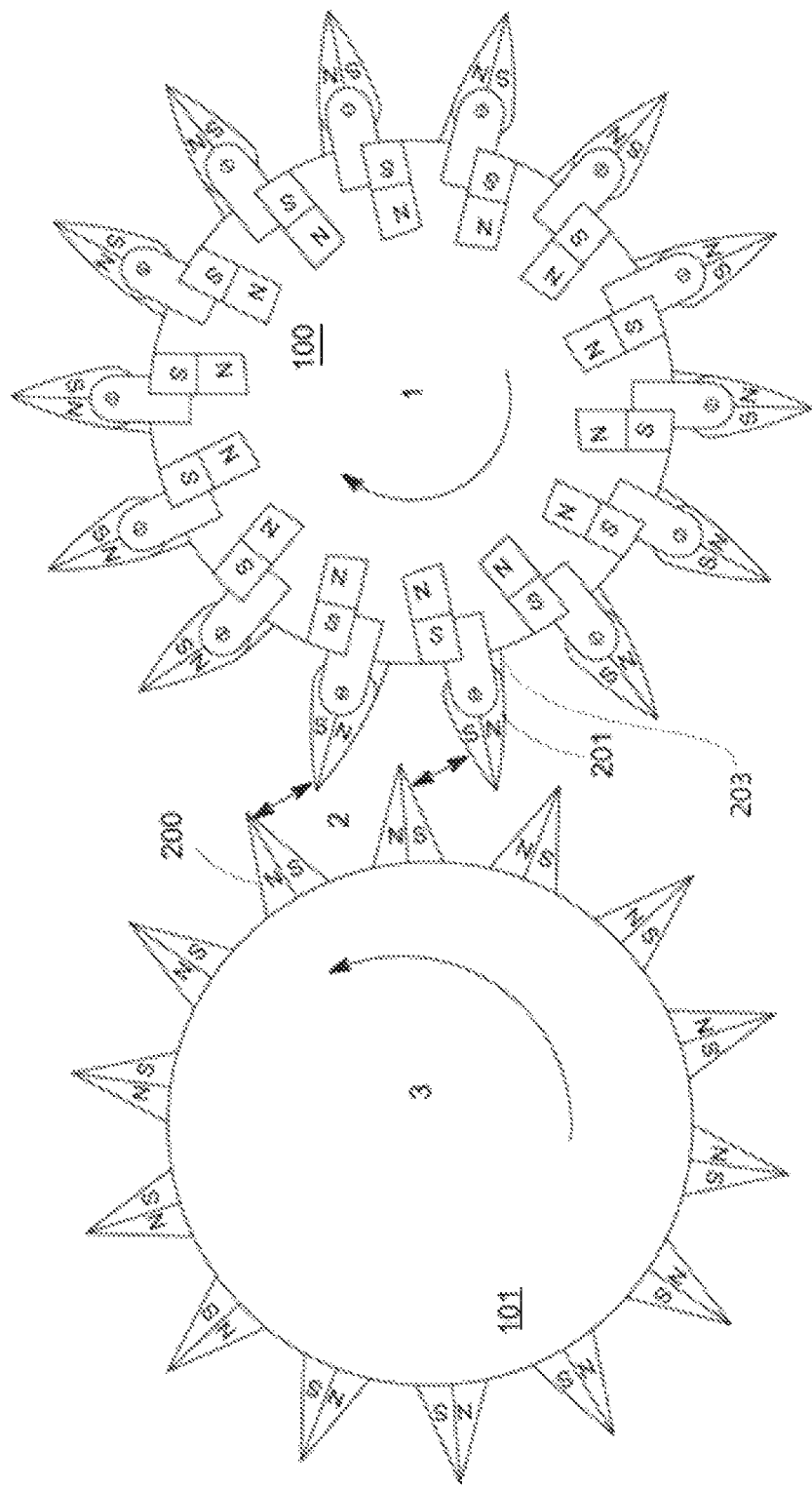
FIG. 4 is an alternate embodiment of magnetic selective motion transfer, illustrating that magnetic unidirectional collapsible teeth may be provided on a source gear instead of the sink gear, unlike as seen in the previous FIG. 1. The depicted scenario is when the gears are engaged and motion transfer occurs via erect teeth.

FIG. 4. Is a front view of an alternate embodiment of the magnetic selective motion transfer mechanism wherein the source body 100 and sink body 101 are both gears, but wherein the source body 100 comprises magnetic unidirectional collapsible teeth 201, and the sink body comprises rigid magnetic teeth 200, to carry out the same effective functionality as the embodiment in FIGS. 1 and 2. This is to show that in the present invention, the collapsible teeth may occur on any of the source and sink bodies, while rigid teeth may occur on the opposite body from that of the collapsible teeth; this can be referred to "interchangeable rigidity-collapsibility roles" herein. In the embodiment in FIG. 4, when the source gear 100 moves in a first direction (clockwise in this example), the interacting collapsible teeth 201 encounter repulsion forces due to rigid magnetic teeth presence 200. The source teeth remain erect during the encounter because the rigid teeth are exerting forces on the collapsible teeth toward the side of the collapse blocker 203 presence, thus blocking the collapse of said collapsible teeth 201. Due to the erect interacting source teeth 201, the motion of the source body 100 is transferred to the sink body 101.

Figure 5:
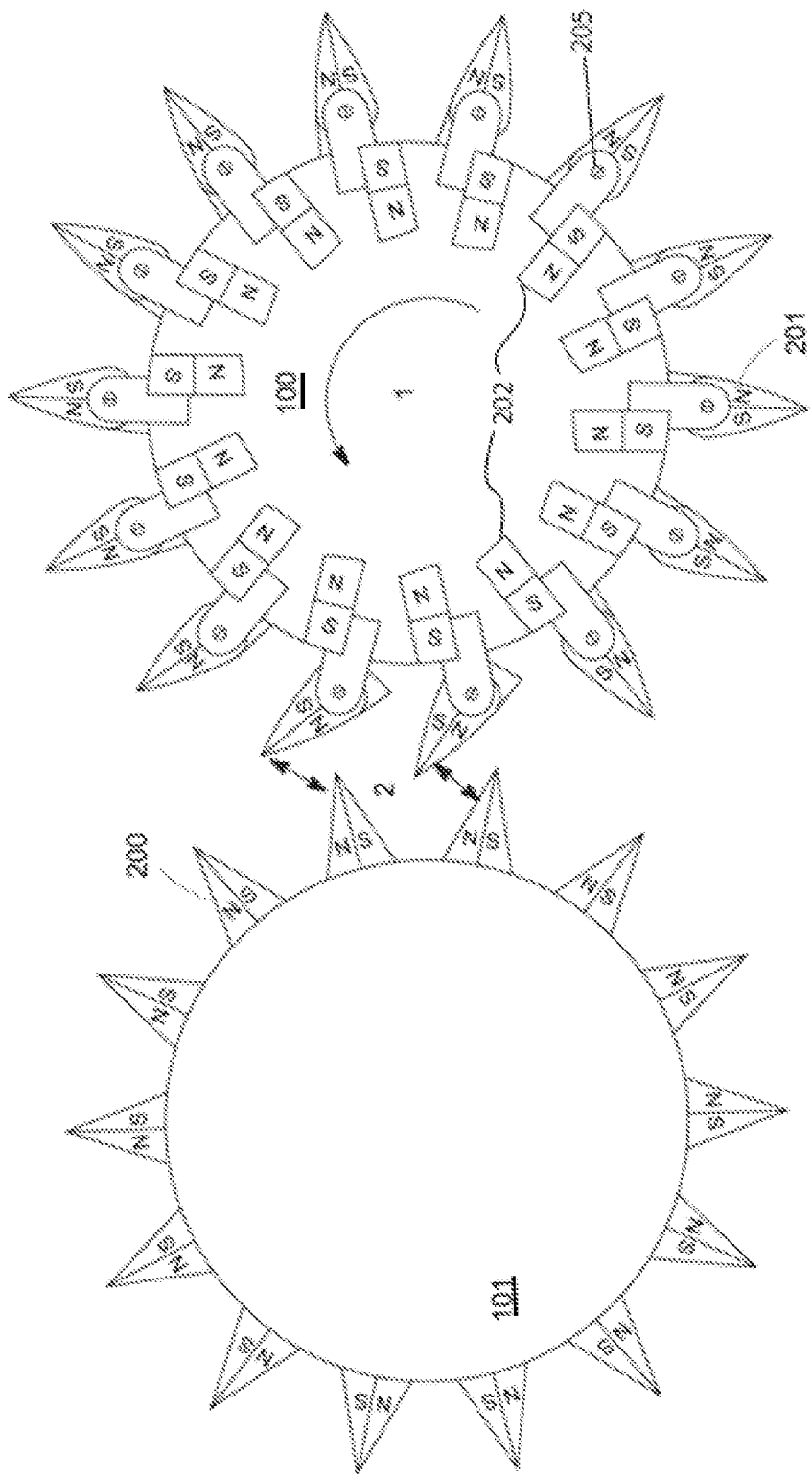
FIG. 5 depicts an alternate scenario of the embodiment illustrated in FIG. 4, in which the source gear moves in a direction that causes collapse of the unidirectional collapsible teeth, and thus leading to a lack of substantial motion transfer between the source and sink.

FIG. 5 shows the same embodiment as FIG. 4, but in a scenario in which the source body moves in a second direction (counter-clockwise in this example), wherein the collapsible teeth 201 that are interacting, encounter repulsion forces due to rigid teeth presence 200, and because of the lack of collapse blockers in the direction in which the rigid teeth are forcing the collapsible teeth, the interacting collapsible teeth collapse. Due to collapsed interacting collapsible teeth 201, there is a substantial lack of motion transfer between the source and sink teeth. In the preferred embodiment, the erectile magnets 202 are composed on the same body (source or sink) as the collapsible teeth 201.

Figure 6:
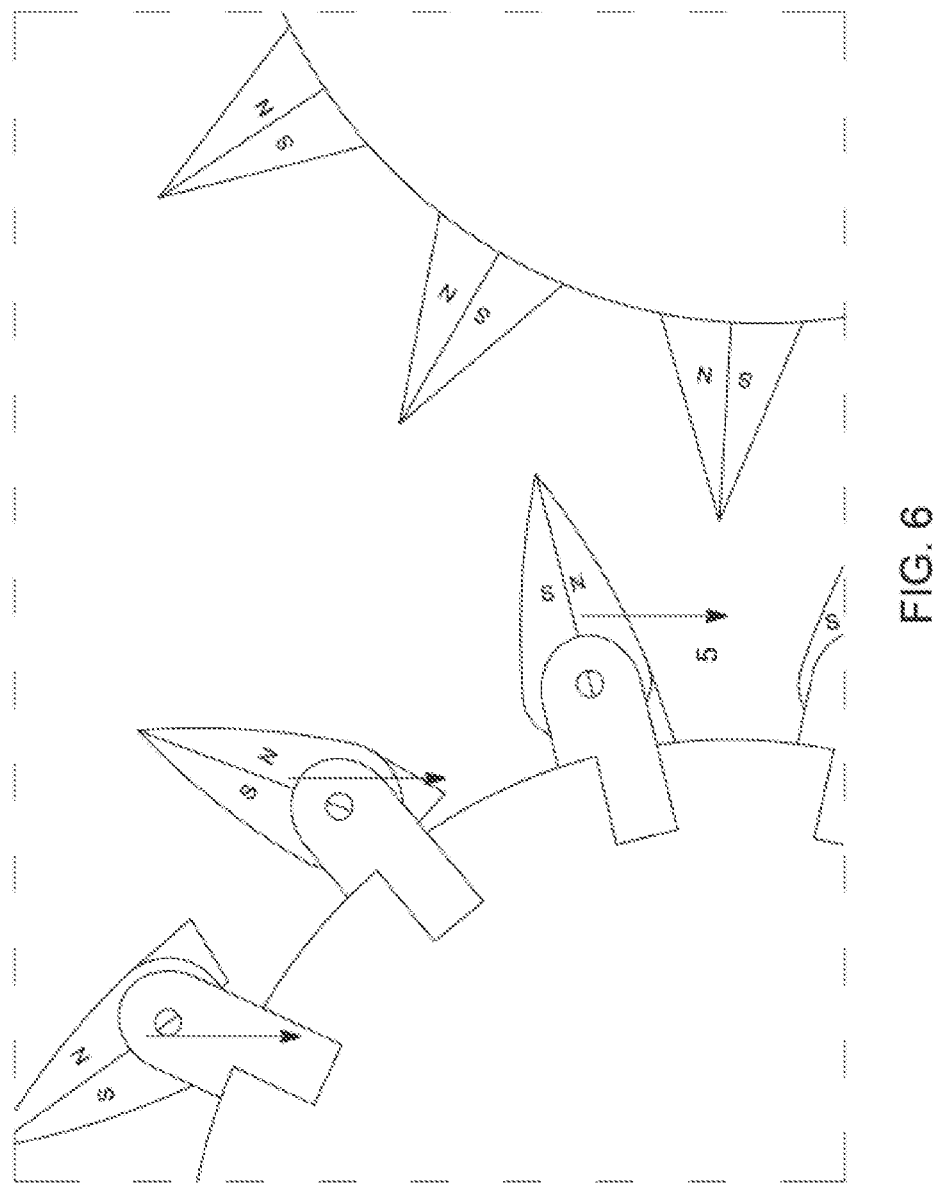
FIG. 6 is a close up view of an alternate embodiment of magnetic selective motion transfer, utilizing weight-driven re-erection instead of a magnetic source for erectile force.

FIG. 6 shows the front closeup view of an alternate embodiment of the present invention in which the magnetic collapsible teeth undergo erection due to weight 5 of said teeth instead of a magnetic source of erectile force.

Figure 7:
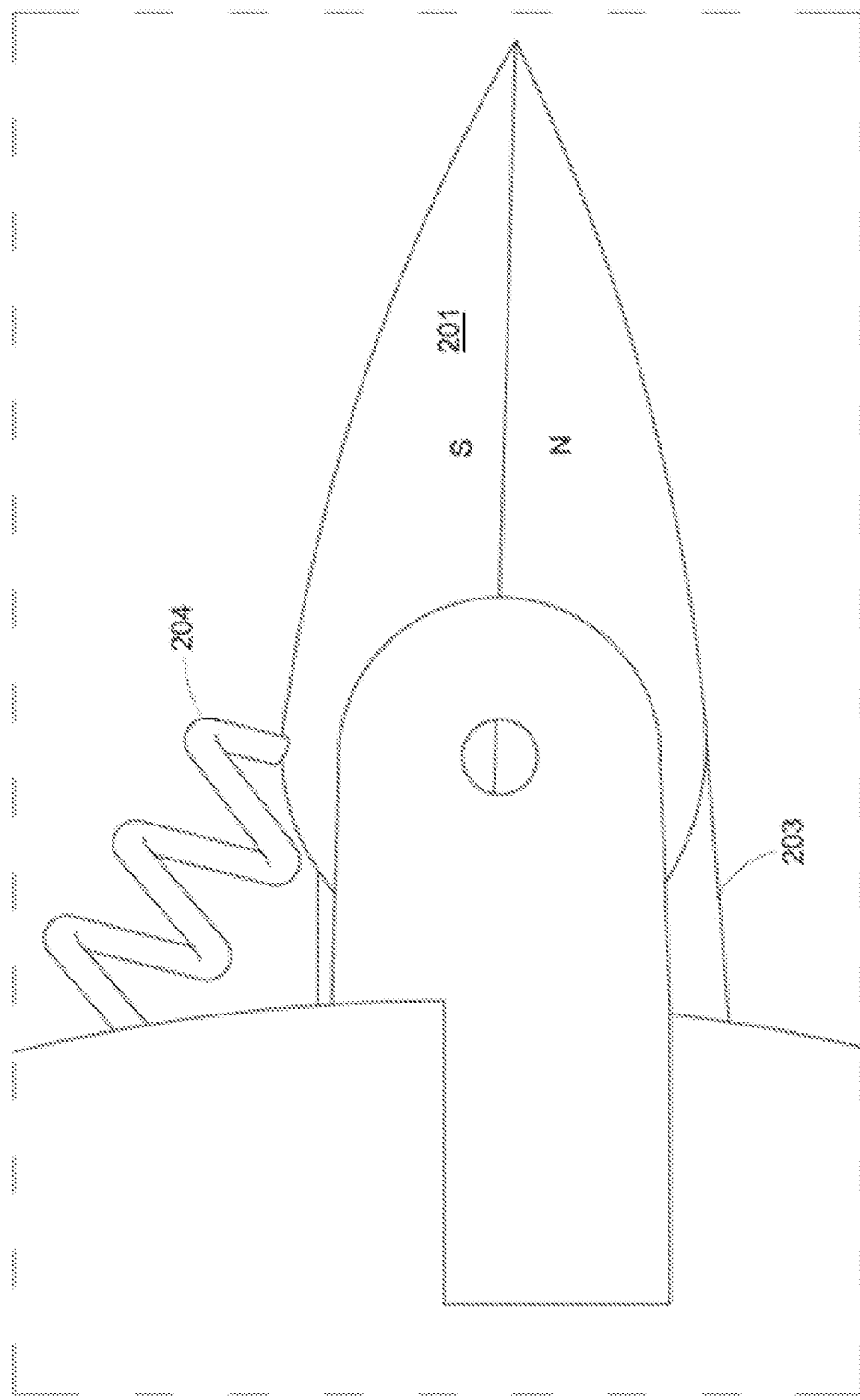
FIG. 7 is a close up view of an alternate embodiment of a magnetic selective motion transfer mechanism, utilizing spring-forced re-erection instead of a magnetic source for erectile force.

FIG. 7 is a front closeup view of an alternate embodiment of the present invention in which a magnetic collapsible tooth is maintained erect due to an elastic source of erectile force: a spring 204, instead of a magnetic source of erectile force.

Source and sink gears are mere examples of bodies that may facilitate selective motion transfer: a mechanism consisting of a body comprising unidirectional collapsible magnetic teeth and a body comprising rigidly attached magnetic teeth may carry out the disclosed method.

Magnetic Motion Rectifier

Magnetic Alternating-to-Direct Motion Converter, ADMC

Figure 8:
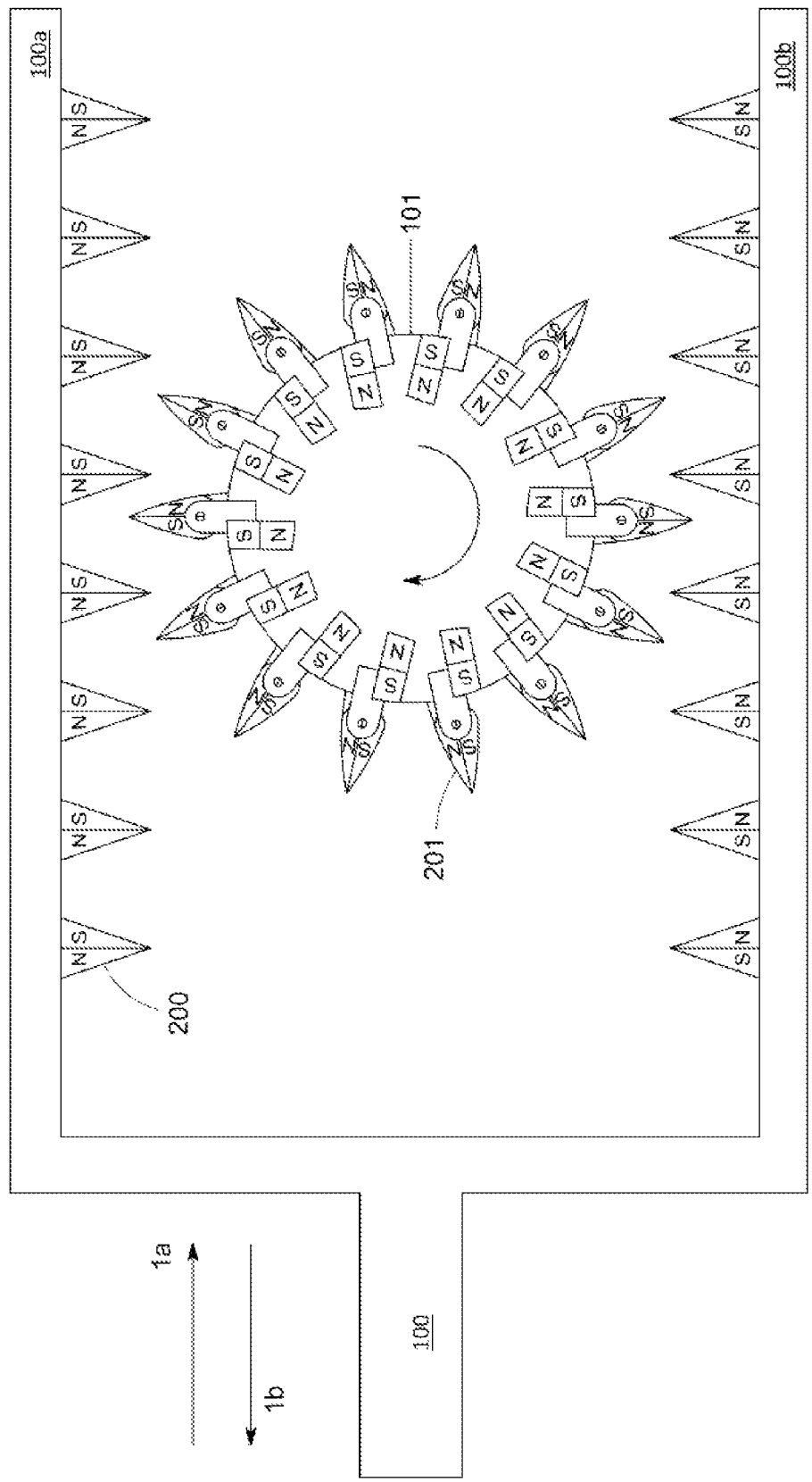
FIG. 8 depicts an embodiment of the present invention, wherein the magnetic selective motion transfer method of the previous figures are used in a configuration that enables conversion of both directions of bidirectional motion to unidirectional motion, thereby functionally achieving an alternating-to-direct motion converter (ADMC), wherein a bi-rack source body interacts with a single pinion sink body comprising collapsible teeth.

An object of the present invention is to provide means of magnetically rectifying bidirectional input motion into a steady, unidirectional motion of output. Shown in FIG. 8, a Magnetic Alternating-to-Direct Motion Converter (ADMC) utilizes the concept of selective motion transfer to generate consistent unidirectional motion from alternating motion. In this embodiment, a source body 100 in the form of a rack comprising of an upper arm 100a and a lower arm 100b and sink body 101 in the form of a pinion gear, with fixed magnetic teeth 200 on the rack arms and unidirectional collapsible magnetic teeth 201 on the pinion, form a motion rectifier. This configuration satisfies the magnetic conversion of bidirectional to unidirectional motion, as follows.

Figure 9:
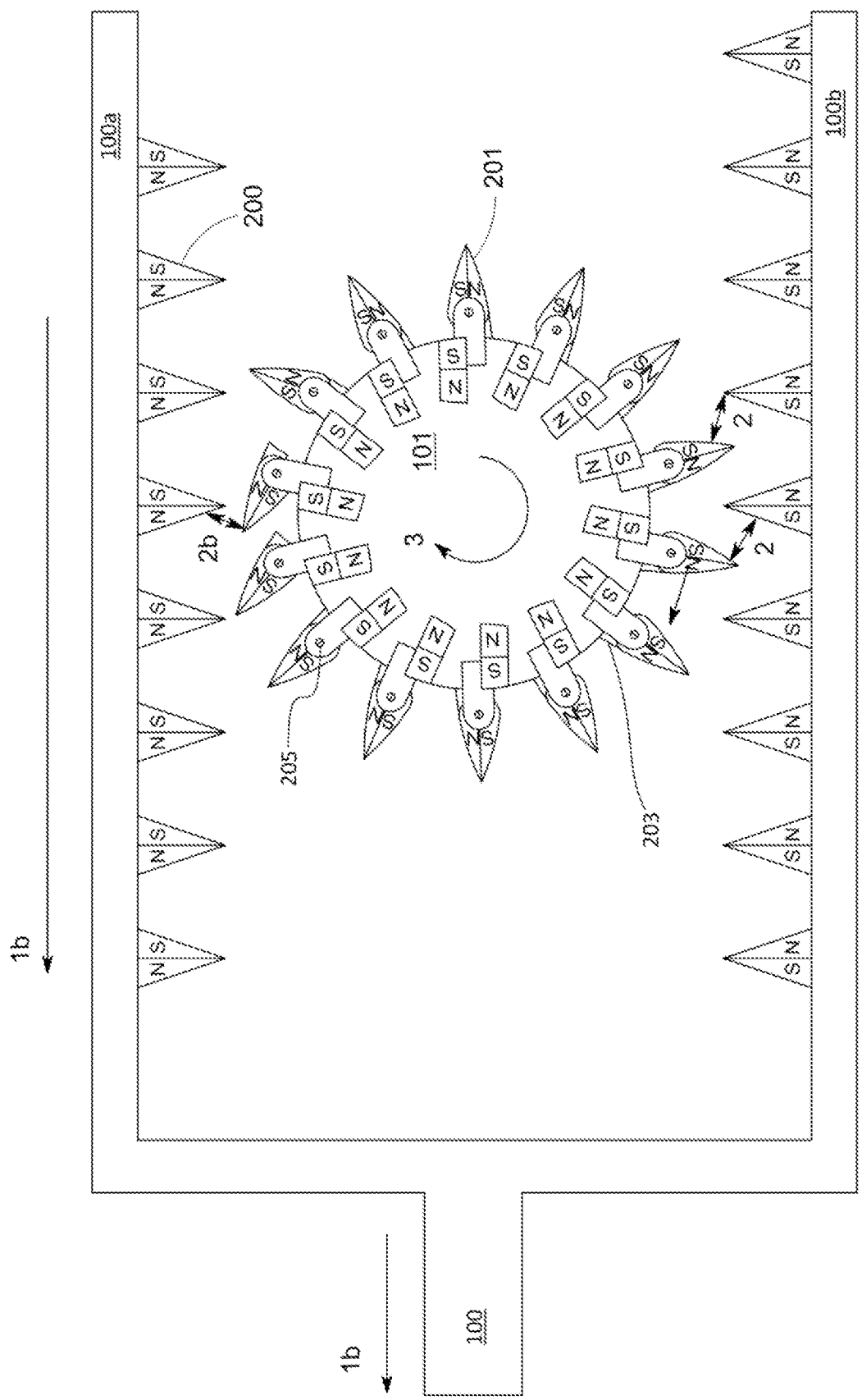
FIG. 9 is a view of the embodiment of FIG. 8, wherein the source rack moves in a first direction, and wherein interacting collapsible teeth on a bottom half of the sink gear remain erect to facilitate motion transfer from source to sink, and wherein interacting collapsible teeth on a top half of the sink gear collapse to inhibit motion from source to sink bodies on said top half.

FIG. 9 shows the motion of the rack 100 in a first direction 1b (left in this example), therefore moving its upper 100a and lower 100b arms in said first direction also. In the lower rack arm 100b, the magnetic rigid teeth 200 cause a net repulsion force 2 on the collapsible sink teeth 201 in said first direction; this is because the source teeth 200 that are approaching sink teeth 201 exert a greater repulsion force than the source teeth that are departing said sink teeth. The magnetic unidirectional collapsible teeth of the sink gear 201 that are interacting with the lower rack arm 100b remain erect due to the presence of collapse blockers 203 in the direction of said net repulsive force on said collapsible teeth. Thus, a moment is applied about the center of the sink gear, causing it to spin clockwise 3. Whereas, the upper rack 100a has source teeth configured laterally inverted compared to the lower rack arm 100b in terms of the magnetic poles of each tooth. The sink teeth 201 interacting with the upper arm collapse due to the lack of collapse blockers 203 in said first direction, and thus do not transfer motion, and therefore do not substantially inhibit the sink body motion 3 that is caused by the interaction with the lower arm 100b of the source rack with the sink teeth. As the sink gear rotates, collapsed teeth that stop interacting with the upper arm are able to re-erect due to the repulsion forces of the erectile magnets composed within the sink gear 101.

Figure 10:
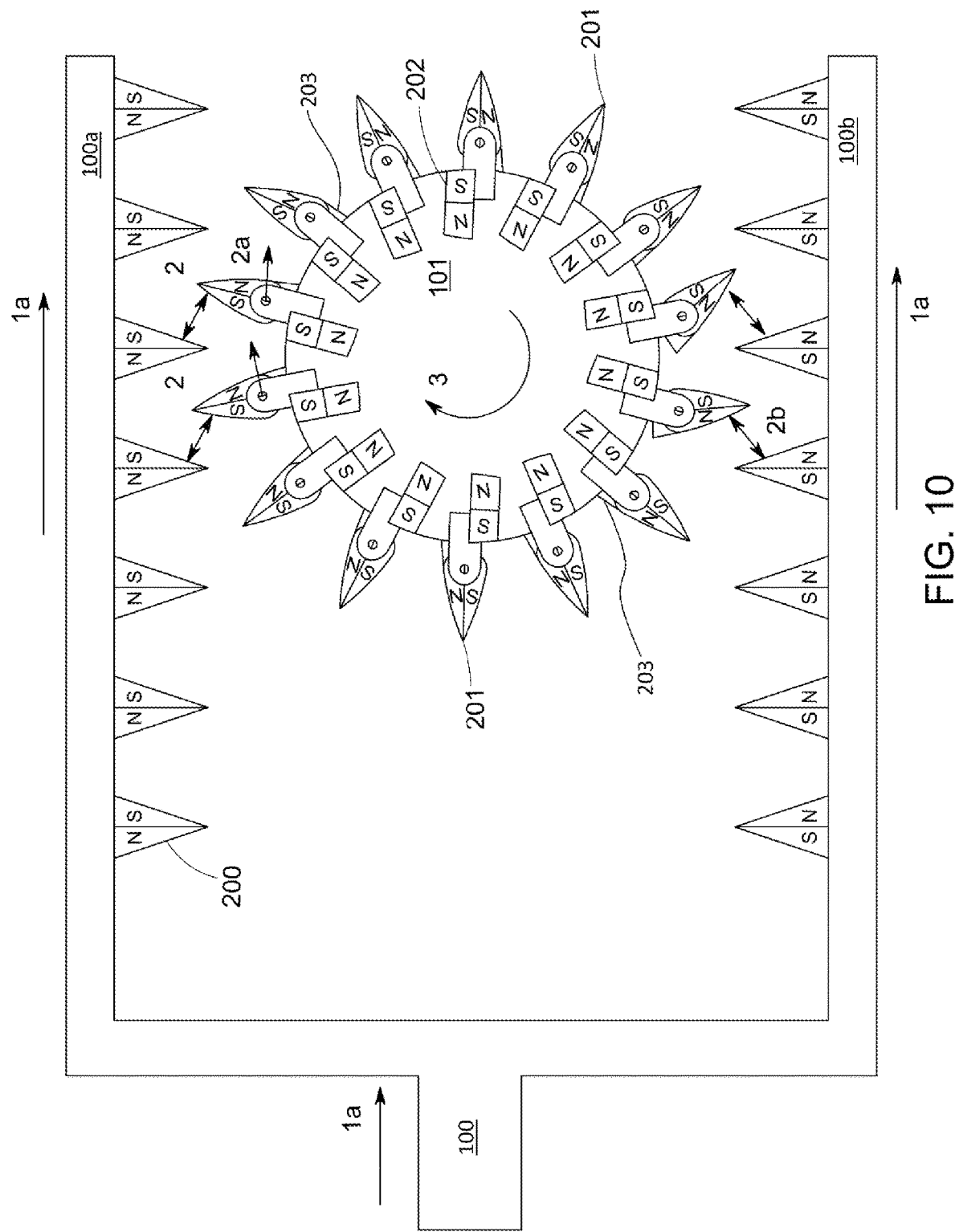
FIG. 10 is a view of the embodiment of FIG. 8, wherein the source rack moves in a second, opposite direction to the first, and wherein the collapsible teeth of the sink gear remain erect on the top half of the sink gear, but collapse on the bottom half of said gear.

FIG. 10 shows the motion of the rack 100 in a second direction 1a (right in this example), therefore moving its upper 100a and lower 100b arms in said second direction also. In the upper rack arm 100a, the magnetic rigid teeth 200 cause a net repulsion force on the collapsible sink teeth 201 in said first direction; this is because the source teeth 200 that are approaching sink teeth 201 exert a greater repulsion force than the source teeth that are departing said sink teeth. The magnetic unidirectional collapsible teeth 201 of the sink gear 101 interacting with the upper rack arm 100a remain erect due to the presence of collapse blockers 203 in the direction of said net repulsive force. Thus, a moment is applied about the center of the sink gear, causing it to spin clockwise 3. Whereas, the lower rack 100*b* has source teeth configured laterally inverted compared to the upper rack arm 100*a* in terms of the magnetic poles of each tooth. The sink teeth 201 interacting with the lower arm, collapse due to the lack of collapse blockers 203 in said second direction 1*a*, and thus do not transfer motion, and therefore does not substantially inhibit the sink body motion 3 caused by the interaction with the upper arm 100*a* of the source rack with sink teeth. As the sink gear rotates, collapsed teeth that stop interacting with the lower arm are able to re-erect due to the repulsion forces of the erectile magnets comprised in the sink body 101.

For both directions of source body motion, the direction of sink body motion remains the same, effectively achieving motion rectification (the function of an ADMC). Embodiments with interchangeable rigidity-collapsibility roles are incorporated herein by this statement.

Figure 11:
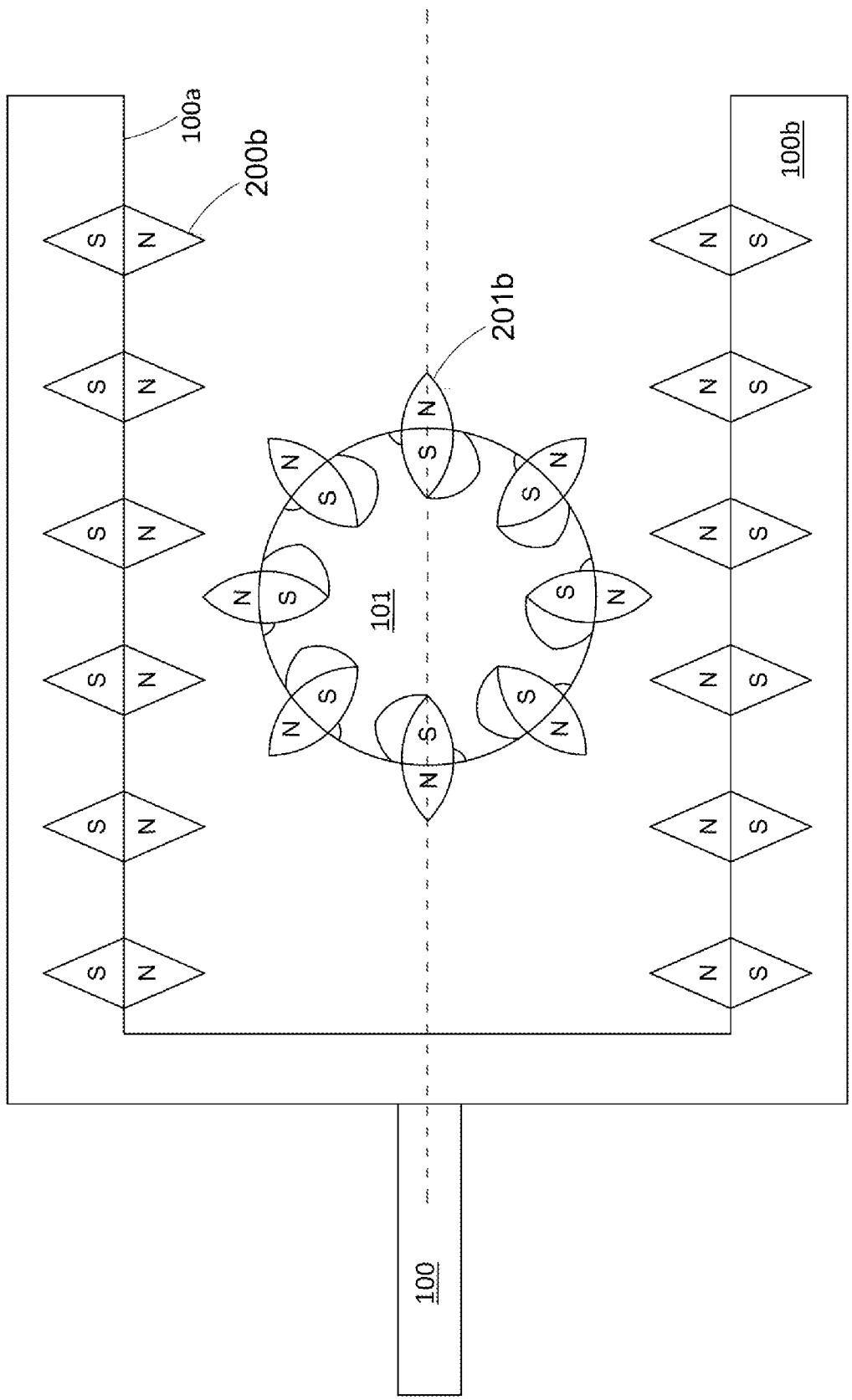
FIG. 11 is an alternate embodiment of the present invention, wherein one pole of the magnetic teeth is embedded into the source and sink bodies to achieve the same function as any of the previous figures: selective motion transfer and/or ADMC.
Figure 12:
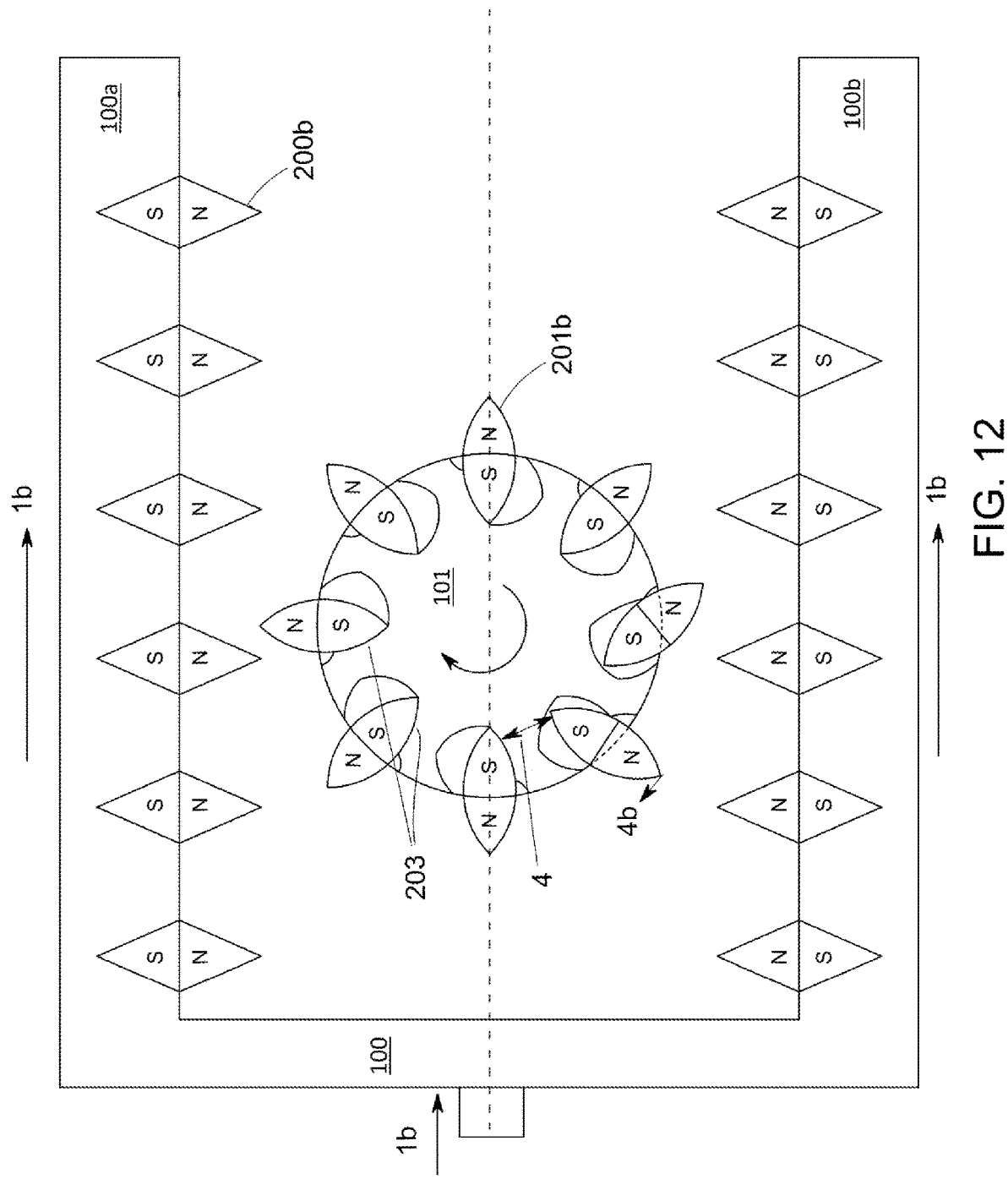
FIG. 12 is the embodiment of FIG. 11, wherein tooth collapse is depicted on the bottom half of the sink (receiving) gear, but erect teeth facilitating motion transfer is depicted on the top half of said gear.

FIG. 11 shows another embodiment of the magnetic motion rectification mechanism with embedded magnetic poles. In some embodiments (as in FIG. 11), all south poles are substantially embedded into the source and sink bodies. In other embodiments, all north poles are substantially embedded into the source and sink bodies. This embodiment allows like poles between source and sink to interact (repel) with less disruption from unlike poles. FIG. 12 shows the embodiment of FIG. 11, with the source body rack 100 moving in a first direction 1*b*. In the embodiment shown in FIG. 12, an effective collapse blocker 203 occurs within the sink gear due to a physical limiter that limits the tooth's range of motion. Additionally, some embodiments may not require an additional erectile force element since the adjacent magnet's like pole will produce a repelling erectile force 4 to erect a collapsed tooth 4*b* once source teeth are out of range, however in other embodiments, erectile magnets and/or other sources of erectile force are composed on the body that comprises collapsible teeth. Embodiments with interchangeable rigidity-collapsibility roles are incorporated herein by this statement.

Figure 13:
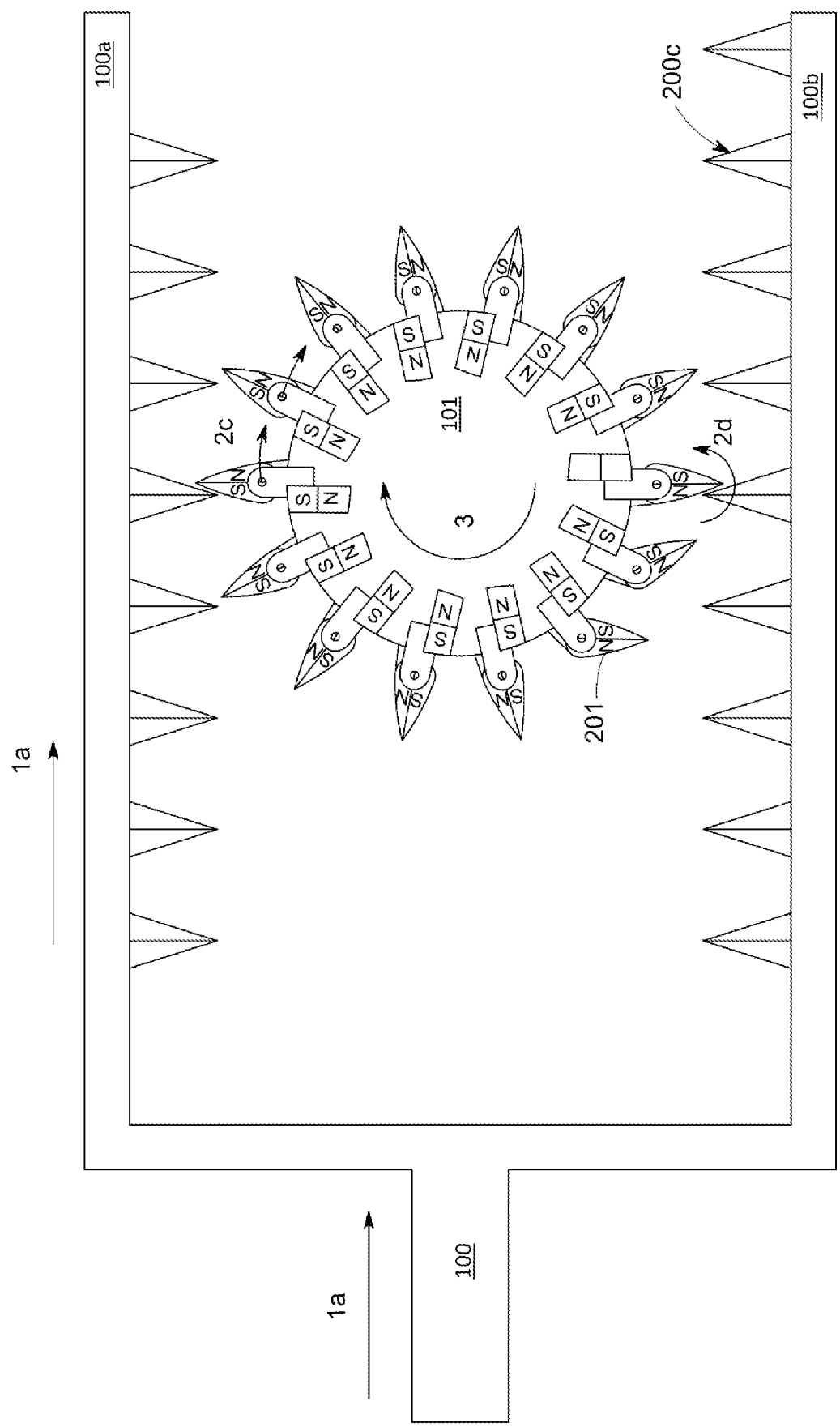
FIG. 13 is a view of an alternate, partially magnetic ADMC embodiment, in which one of source and sink bodies comprises magnetic teeth and magnetic source of erectile force while the other body comprises non-magnetic teeth 200c.
Figure 14:
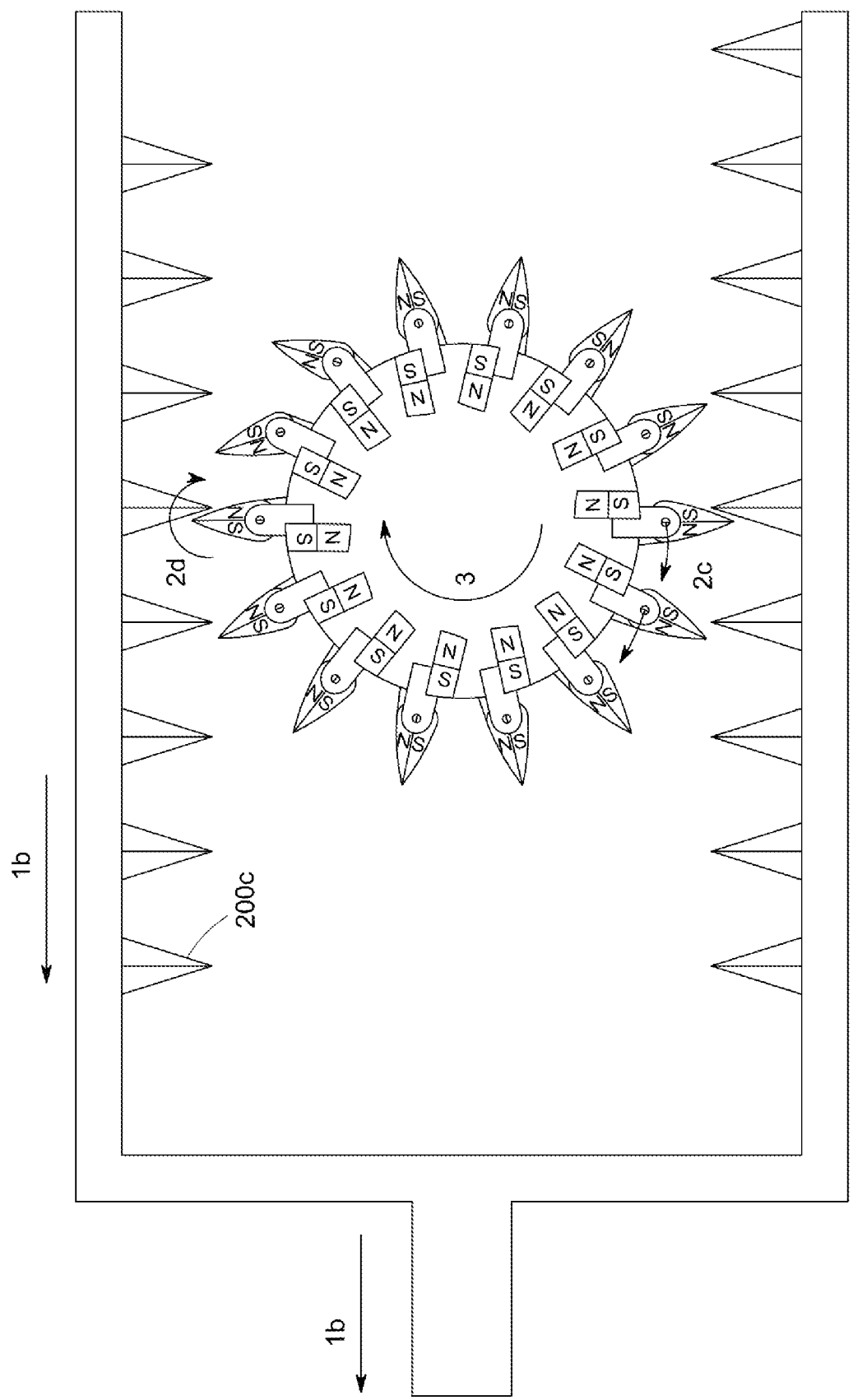
FIG. 14 is a view of the alternate scenario of FIG. 13, wherein the source body has changed direction, and the sink body moves in the same direction as in FIG. 13. Both directions of the source body are converted to the same direction to the sink body.

In some embodiments, as shown in FIGS. 13 and 14, the rigid teeth 200*c* are non-magnetic, while the collapsible unidirectional teeth 201 are magnetic (either embedded pole or non-embedded). In this embodiment, the teeth of the source body and sink body are allowed to physically interact with contact, both during the erect transfer of motion from source to sink, and during collapse of the collapsible teeth. In this embodiment a magnetic source for erectile force is present for each magnetic unidirectional collapsible tooth 201, allowing for proper erection of said collapsible tooth. The embodiments in FIGS. 13 and 14 depict a partially magnetic motion rectifier, whereas the embodiments in FIGS. 8, 9, 10, 11 and 12 depict a fully magnetic rectifier.

Figure 15:
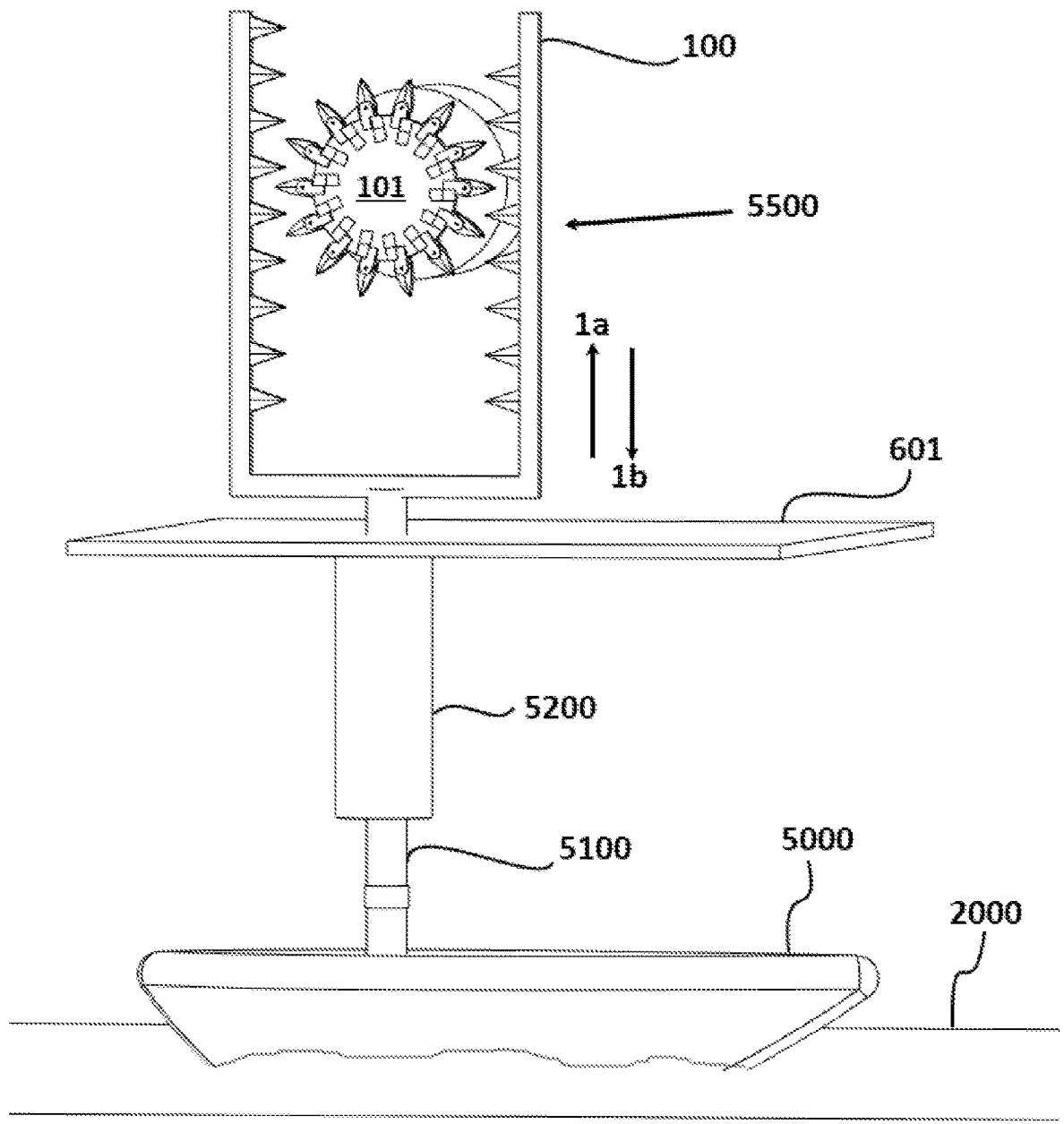
FIG. 15 is an embodiment of the present invention in which an at least partially magnetic motion rectifier is used to convert bidirectional motion captured from waves of a water body into unidirectional motion.

Motion rectification can be a very advantageous feature in wave energy, allowing for smooth unidirectional motion transfer to a generator. FIG. 15 shows an embodiment of the present invention in which an at least partially magnetic motion rectifier 5500 is used to rectify bidirectional motion 1*a* and 1*b* produced by a buoyant body 5000 at least partially submerged in a body of water 2000. An optional spring 5200 ensures fast return of said body prior to encountering the next wave. The rectified motion from pinion gear 101 can be transferred to at least one of a pump for desalination, an electric generator and an energy storage system such as a flywheel.

Other embodiments of motion rectification systems, also known as alternating-to-direct motion converters (ADMCs) can be seen in my previous invention patent application U.S. Ser. No. 17/388,559 filed in Jul. 29, 2021, which is incorporated herein in its entirety by this reference. In any of the ADMC embodiments presented in this incorporated patent application, having magnetic means for re-erection of unidirectional collapsible teeth, by adding a magnet in the receiving (sink) gear body and having magnetic unidirectional collapsible teeth, will allow for an at least partially magnetic motion rectifier of this present invention.

Figure 16:
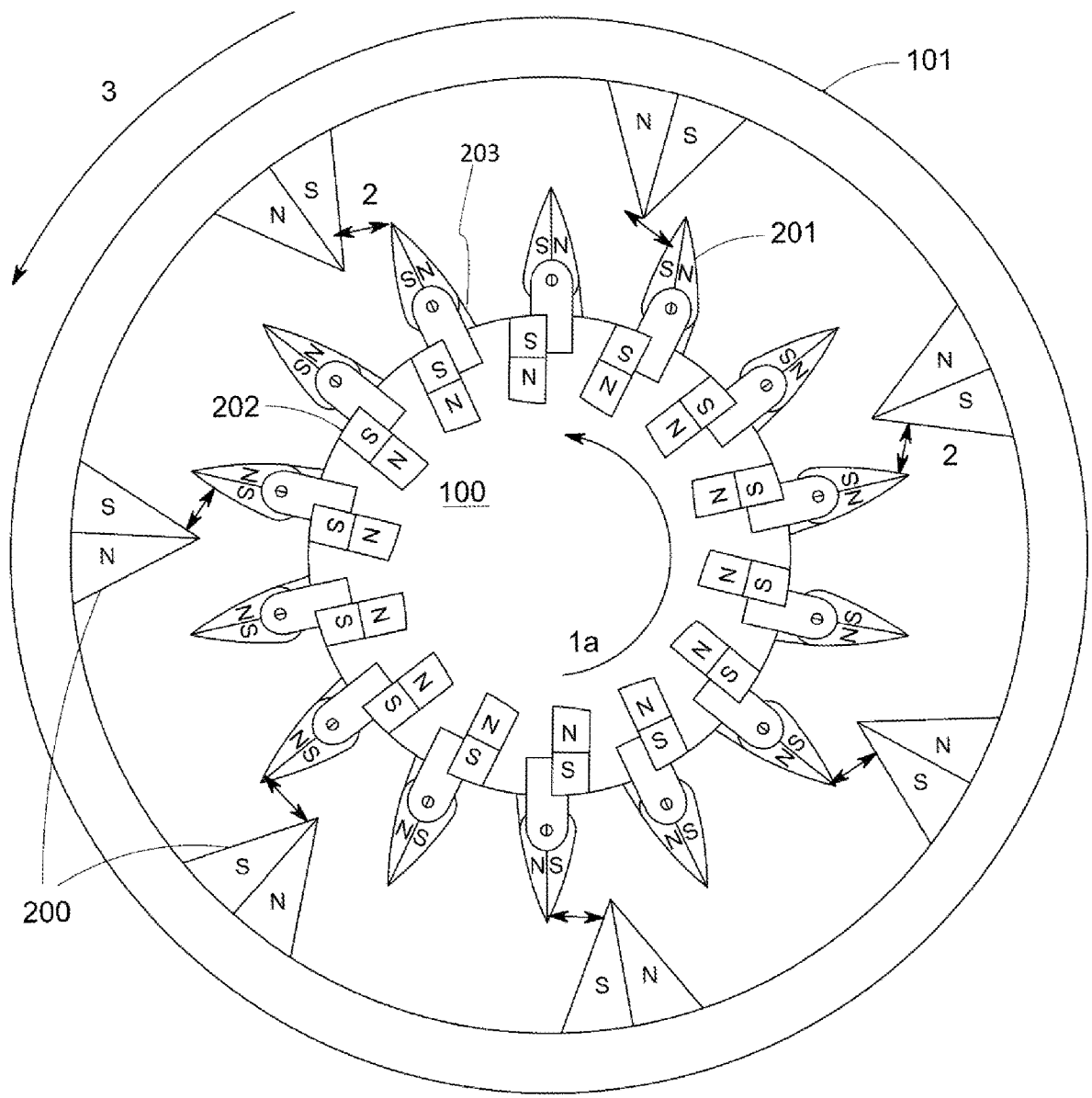
FIG. 16 is an alternate embodiment of a selective motion transfer mechanism comprising planetary gears in which one gear is a source (center) and one gear is a sink, with one of said gears comprising magnetic unidirectional collapsible teeth.

FIG. 16 shows an embodiment of a selective motion transfer mechanism comprising a conventional gear and a planetary gear. As seen in FIG. 16, the outermost planetary gear is the sink gear 101 in this particular example, the innermost gear is the source gear 100 comprising the collapsible unidirectional teeth 201. When the source gear 100 moves counter-clockwise in the example configuration of FIG. 16, source teeth encounter repulsive forces 2 due to the presence of similar magnetic polarities if the rigid sink teeth 200. The source teeth remain erect during this encounter due to the presence of the collapse blockers 203. Due to the erect source teeth 201, the repulsion between source and sink teeth are significantly transferred to the planetary sink gear 101. The sink gear rotates counter-clockwise.

Figure 17:
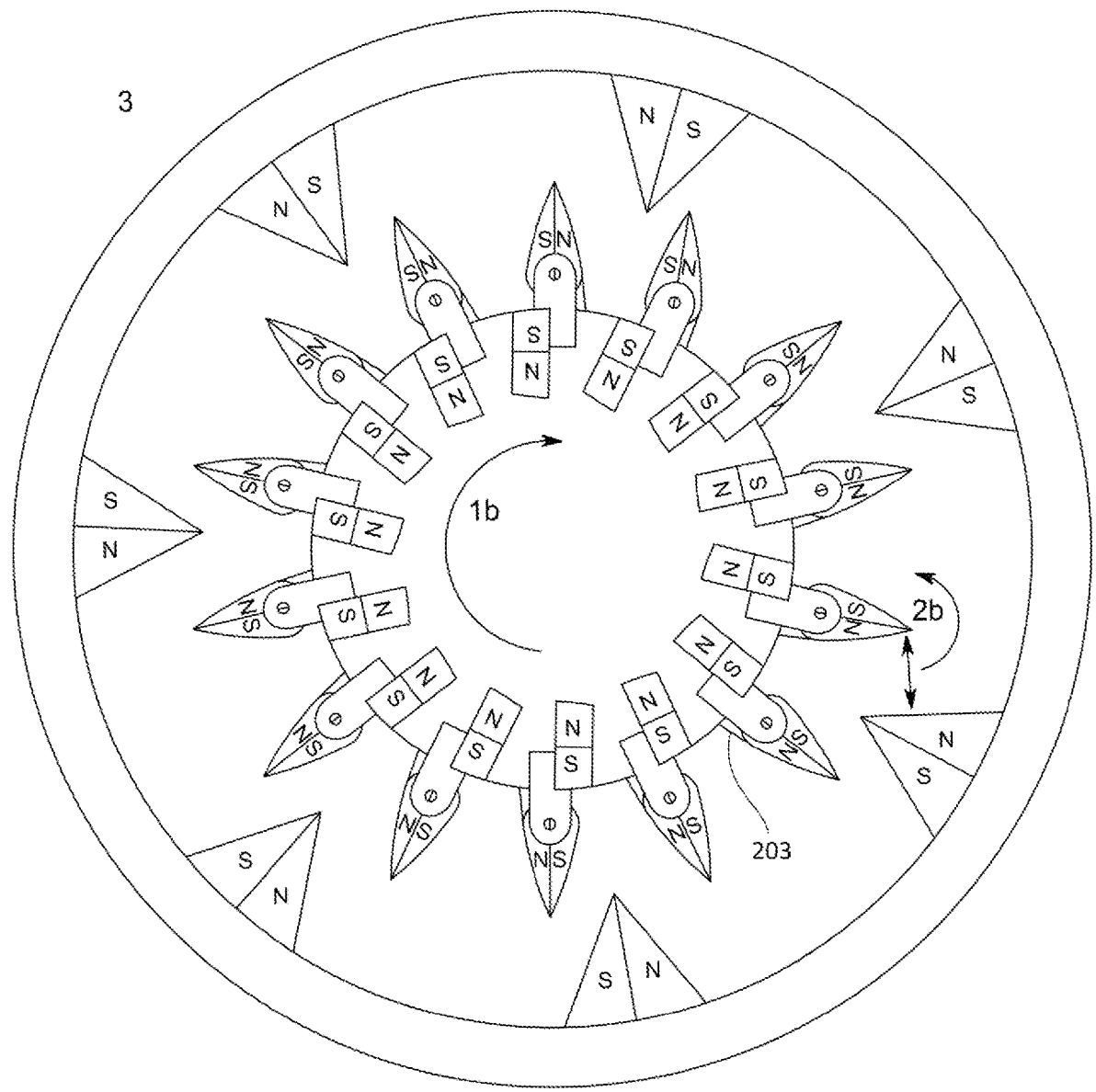
FIG. 17 depicts an alternate scenario of the embodiment in FIG. 16, wherein the source gear turns in the opposite direction, wherein motion is not transferred to the planetary sink gear.

FIG. 17 shows the same embodiment as FIG. 16, but where the source body 100 spins clockwise 1*b*. When the source gear 100 moves clockwise in the example configuration, source teeth encounter repulsive forces 2*b* due to the presence of sink teeth. The source teeth collapse during the encounter due to the lack of collapse blockers 203 on the side of the source teeth in the direction of the said net repulsion exerted on said collapsible source teeth.

Figure 18:
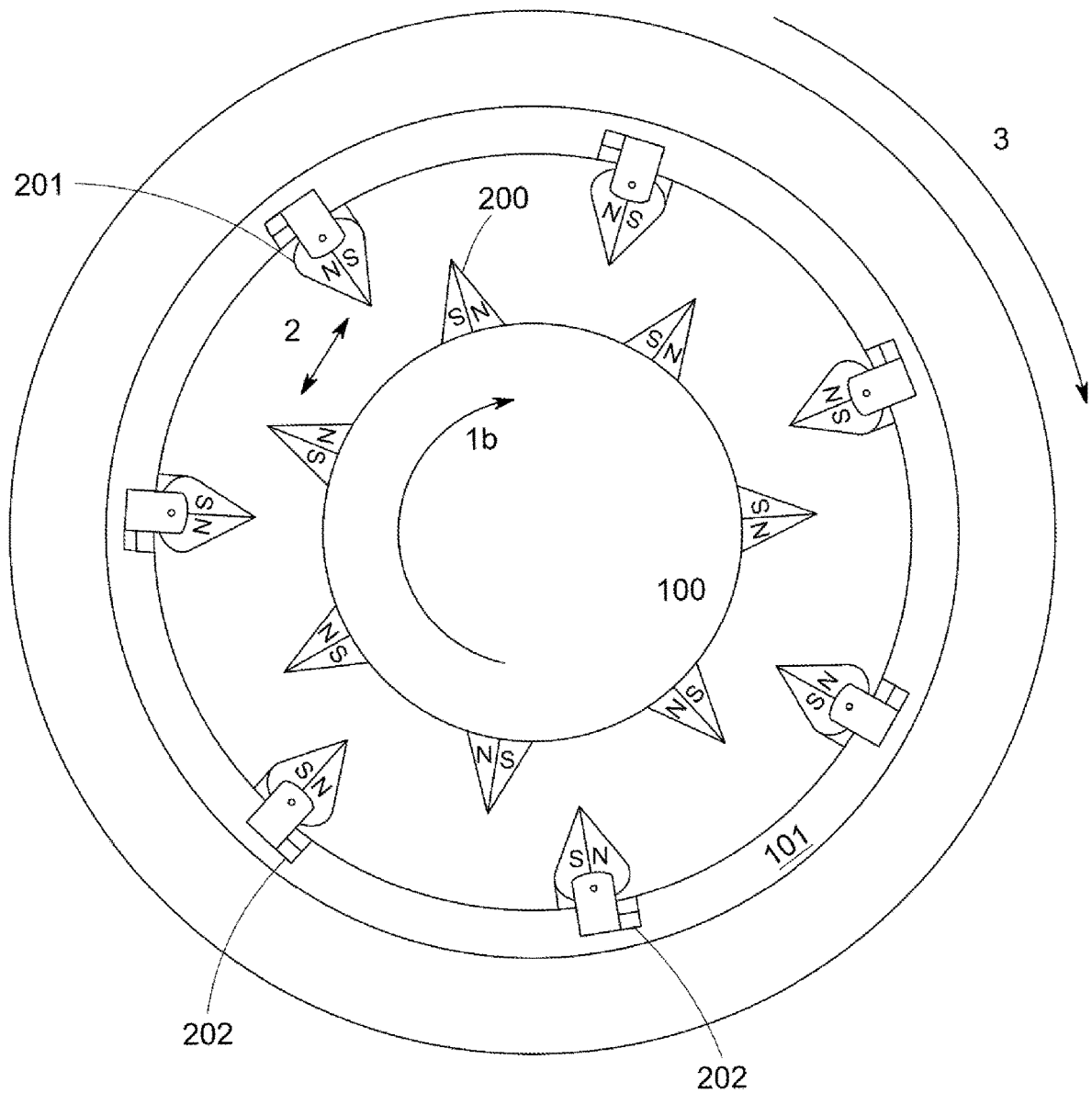
FIG. 18 is a view of an alternate embodiment of a planetary selective motion transfer mechanism wherein the sink gear comprises magnetic unidirectional collapsible teeth. This serves to show that the unidirectional collapsible gear teeth can be composed on the source or sink gear to achieve the same selective motion transfer functionality.
Figure 19:
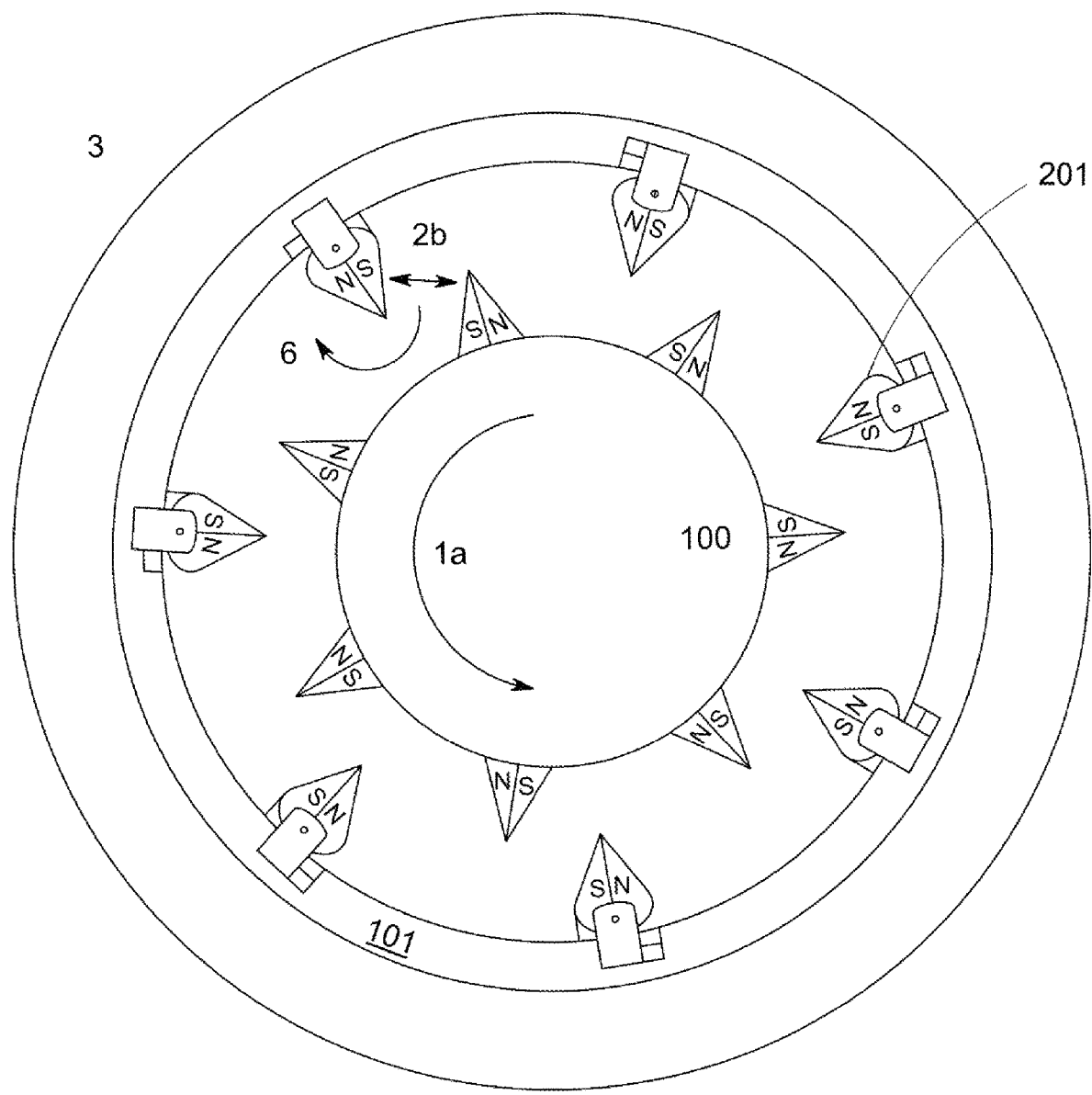
FIG. 19 is a view of an alternate scenario of a planetary selective motion transfer mechanism wherein the source body is moving in the opposite direction to the scenario in FIG. 18.

Embodiments with interchangeable rigidity-collapsibility roles are incorporated herein by this statement, and can be seen in FIG. 18 and FIG. 19 as compared to FIG. 16 and FIG. 17.

In all the above embodiments, teeth were examples of sub-bodies that are connected with bodies. In some embodiments, the sub-bodies may be at least one of pawls, sprags and balls. Other types of sub-bodies may be used.

Clutch Systems

In some embodiments, sub-body structures can be sprags in a sprag clutch. For a sub-body, a collapsed state is one where the sub-body allows the independent movement of the source and sink body, and an erect state is a state in which the sub-body composed on a first body is able to engage with a second body and transfer motion between the first and second body.

Figure 20:
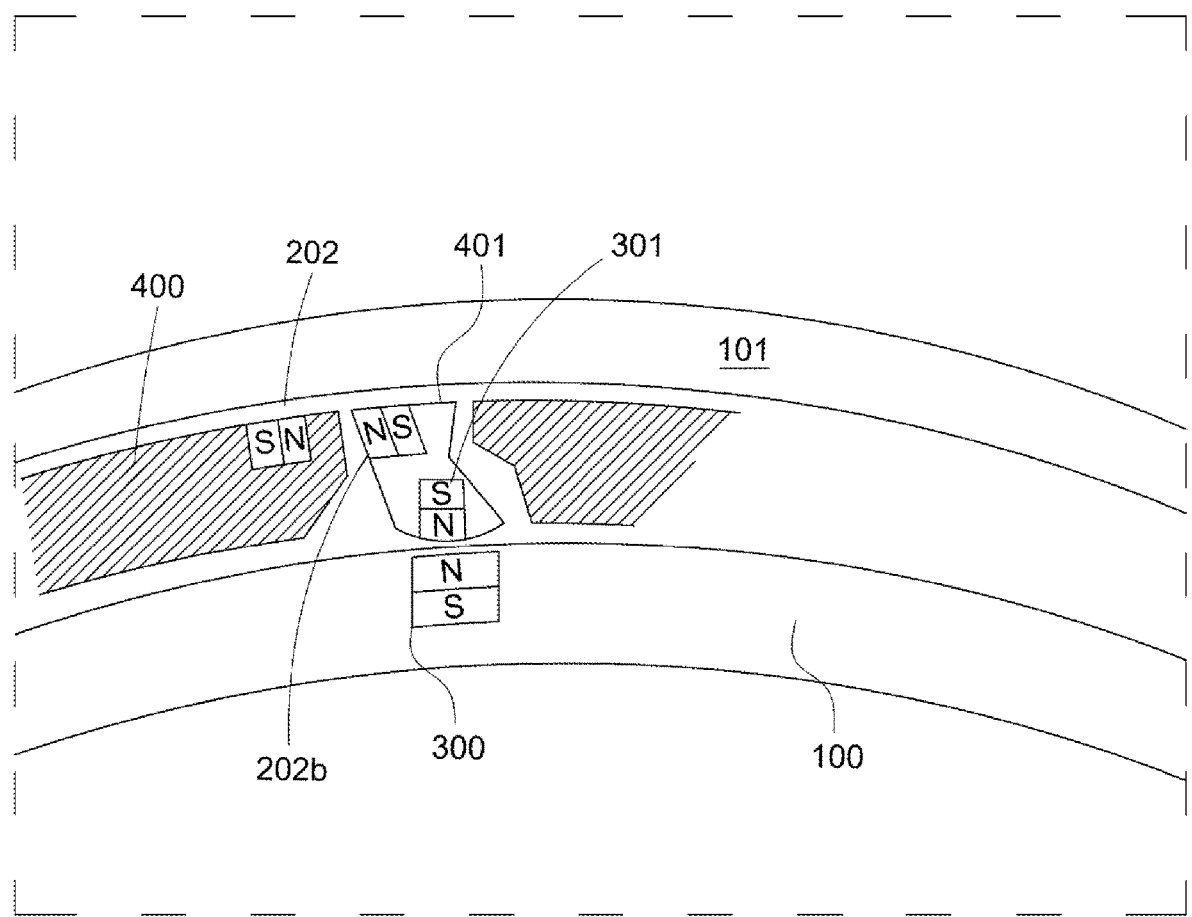
FIG. 20 is a view of an alternate selective motion transfer clutch mechanism comprising a source ring, a sink ring, and a magnetic and/or electromagnetic sprag that locks or unlocks dependent upon direction of source ring motion, with a magnetic and/or electromagnetic source of sprag re-erection.

Referring to FIG. 20, a view of a clutch-type selective motion transfer mechanism is shown, wherein the sprag 401 is the sub-body, and the source body can be any of the first body 100 and the second body 101, and the sink body can be any of the second body 101 and the first body 100, but not the same body as the source body. In the example shown in FIG. 20, the source body and sink bodies are rings. When the sprag 401 is in a collapsed state, the source ring and sink ring are not coupled and the motion of the source is not transmitted to the sink. An erect state is one where the first body 100 and second body 101 are locked by the sprag 401, and the source body movement is transmitted to the sink body (inability to move independently). The sink ring may be connected with at least one of: a flywheel for energy storage, a generator for electricity conversion and a pump for desalination. In this embodiment, the sprag 401 is magnetic, wherein it either comprises one or more magnets 202*b* and/or itself is a magnet, and wherein re-erection and/or erection maintenance occurs due to another magnet 202 on an interim body 400 that the sprag is connected with. The magnet 202 in the interim body is the erectile magnet in this embodiment. The interim body 400 is, at least one of: rigidly a part of and rigidly connected to, either the first body 100 and the second body 101.

FIG. 20 shows that the interim body 400 comprises the permanent magnet that allows for re-erection of the sprag when collapse-causing forces subside. Referring to FIG. 20, when the first body 100 (whether it be source or sink) rotates in a first direction, clockwise in this example, relative to the second body 101, the sprag 401 rotates counter-clockwise about an axis to collapse, and the first body 100 is able to move freely relative to the second body 101, in other words, the source and sink can move independently, thereby substantially not transferring the source's motion to the sink. In some embodiments, as the first body's 100 motion subsides, the erectile magnet 202 repels the sprag magnet 202b, and causes a moment about an axis that can rotate the sprag clockwise toward re-erection. Whereas, when the first body 100 rotates in a second direction (counter-clockwise in this example), the sprag 401 becomes erect, facilitated by the erectile magnet 202, thereby locking the source and sink bodies allowing motion transfer between the two bodies. In some embodiments, the sprag sub-body may be rotationally connected via a revolute joint to the same body that the interim body is a part of, in other embodiments, the sprag may not be connected to any body, but rather confined to a space, at least partially facilitated by the interim body, allowing a rotational degree of motion.

In some embodiments, optional electromagnets 300 may be used to further facilitate the collapse and frictionless movement of the inner ring relative to the outer ring. Considering a source body being the inner ring 100 as shown in FIG. 20. When the source moves in the non-locking first direction, the electromagnet 300 is powered, in a manner so as to facilitate the sprag's collapse magnetically, to mitigate contact between the source body and the sprag. When the source moves in the lock-intended direction, the electromagnet is powered to attract the sprag and facilitate a quicker lock.

Figure 21:
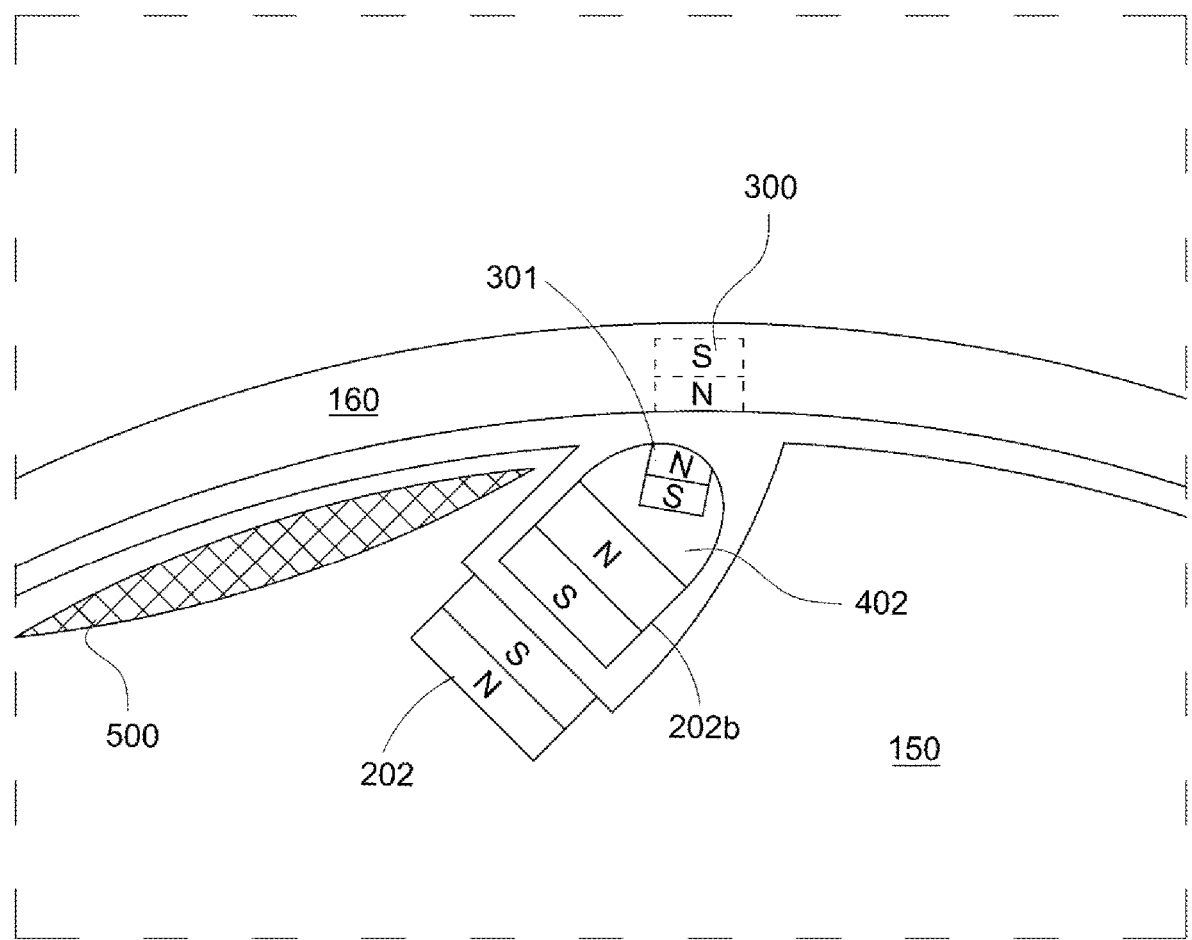
FIG. 21 is a close-up view of an alternate, selective motion transfer clutch mechanism comprising a bullet-like sub-body that facilitates the locking and unlocking of source and sink bodies.

Referring to FIG. 21, another embodiment of the present invention is shown wherein the sub-body 402 is a retractable object confined within a first body 150. A retracted state is analogous to the collapsed state of the previous embodiments wherein the sub-body 402 does not couple the source and sink bodies together in motion. In the example of FIG. 21, when the second body 160 moves in a first direction (left in this example) relative to the first body 150, the second body 160 creates a force on the sub-body 402 that causes it to retract and allow for the second body 160 to spin freely from the first body 150. When the motion of the second body 160 relative to the first body 150 in said first direction subsides, the erectile magnet repels the sub-body 402, causing it to reach a lock-able position, and when the second body 160 moves in a second direction (right in this example) relative to the first body 150, the sub-body 402 is able to couple the first 150 and second 160 bodies so that they no longer move independently. In some embodiments, optional electromagnetic functionality as seen in FIG. 20 may be included (300, 301). In some embodiments, magnetic shielding material 500 may be composed on barriers between separate magnetic functionalities to prevent interferences.

Figure 22:
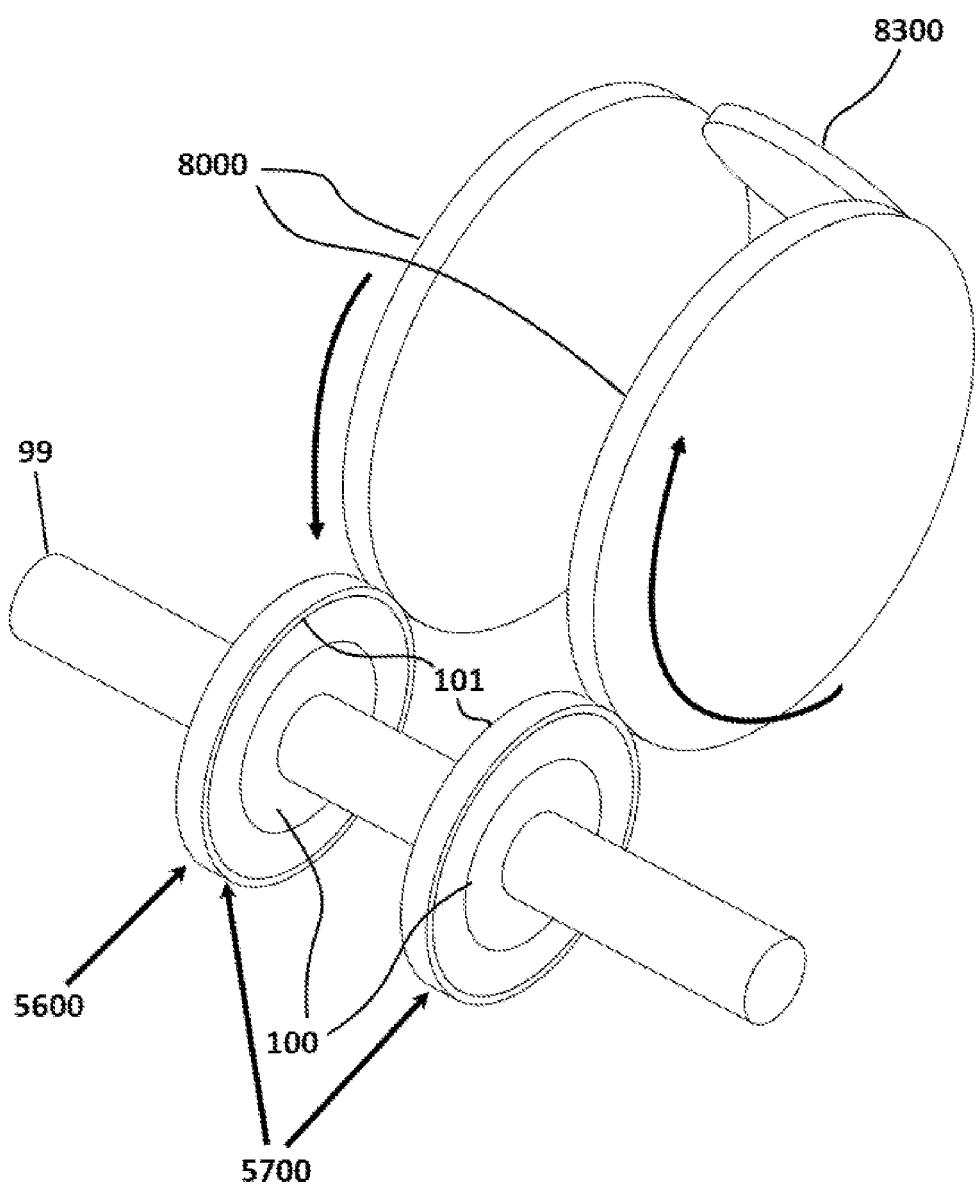
FIG. 22 is a perspective view of a motion rectifier that uses laterally inverted one-way magnetic clutch bearings coupled to a source body to serve as an ADMC.

FIG. 22 serves to provide an example of a motion rectifier mechanism comprising a source shaft 99, two one-way clutch bearings 5700, with at least one of said bearings comprising magnetic source of re-erection force of one or more sub-bodies, with said two clutch bearings 5700 being oppositely configured on a bidirectionally moving source body 99, thereby transferring separated unidirectional motion to sink bodies 101. Opposite configuration means that when the source shaft 99 moves in a first direction, a first bearing couples its corresponding source body 100 with its corresponding sink body 101 while a second bearing decouples its corresponding source and sink bodies, and when the source shaft moves in a second direction, the second bearing couples its corresponding source and sink bodies while the first bearing decouples its corresponding source and sink bearings. This allows for bidirectional motion to be selectively transferred into separate bodies based on the direction of source body motion. As can be seen in FIG. 22, each sink body 101 is connected with a flywheel 8000 to store motion. In some embodiments, the two flywheels 8000 optionally are coupled with each other by a unification gear 8300.

Figure 23:
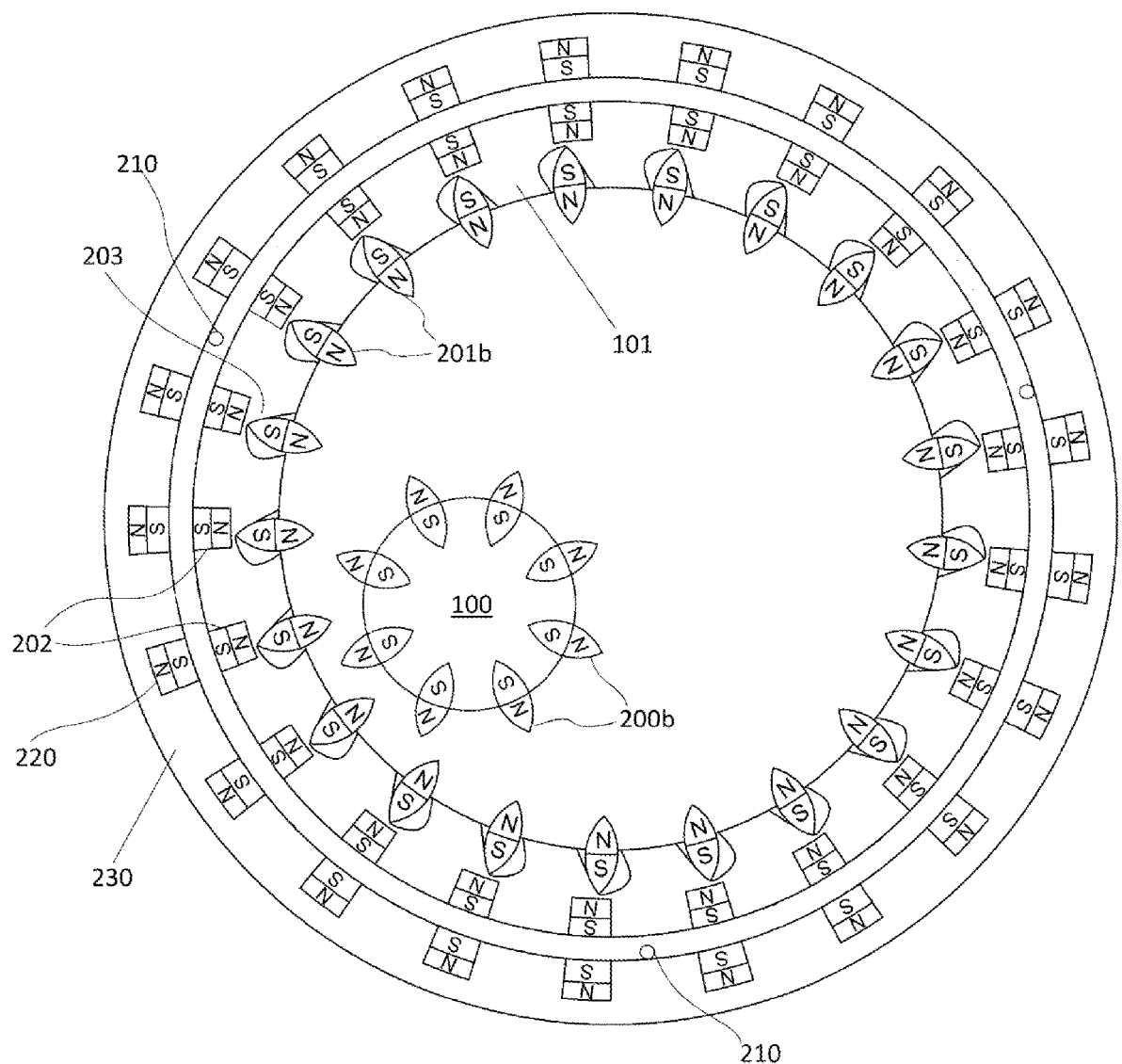
FIG. 23 is a front view of a selective motion transfer mechanism that comprises a flywheel that is supported by magnetic bearings.

Referring to FIG. 23, a front view of an embodiment of the present invention is shown in which selective motion transfer is achieved via a planetary gear configuration. In this embodiment, the source gear 100 comprises rigid permanent dipole magnetic teeth 200b, with one pole of said dipole magnetic teeth being exposed to substantially interact with sink body's sub-bodies 201b which are unidirectional magnetic collapsible teeth. The magnetic collapsible teeth 201b are connected with the sink body 101 by a revolute joint (not pictured in FIG. 23, see 205 in FIG. 5). In the example shown in FIG. 23, if the source body 100 moves counter-clockwise, a clockwise moment is induced on the interacting collapsible teeth 201b, however physical limiters 203, that act as collapse blockers along the direction of the induced moment, prevents collapse of said interacting collapsible teeth 201b, and the erect collapsible teeth therefore couples the source body 100 to the sink body 101 thereby transferring motion between the two bodies. However, if the source body 100 moves clockwise, the moment induced on the magnetic collapsible teeth 201b is counterclockwise, and due to the lack of physical limiter 203 in that direction, the collapsible teeth 201b collapses so as to decouple the source body 100 from the sink body 101 and thereby not transfer motion from the source body 100 to the sink body 101. Once the collapse causing moment subsides, erectile magnets 202 cause the re-erection and maintenance of erection of collapsible teeth 201b. In this embodiment, erectile magnets are configured to provide erection force as an attractive force. In alternative embodiments, the force of erection on a collapsible tooth is repulsive. In some embodiments, some collapsible teeth may have repulsive erectile forces, and some may have attractive ones, but this is not a recommended embodiment.

Referring again to FIG. 23, an embodiment of the present invention is shown where the sink body 101 is at least partially supported by a bearing body 230. In some embodiments, the bearing body comprises bearing magnets 220 that provide net repulsive forces that contribute to supporting the sink body 101, thereby preventing substantial translational motion in any radial direction. In some embodiments, the bearing magnets 220 each provide net repulsion forces against nearby erectile magnets 202 to provide a supporting force. In some embodiments, the sink body 101 acts as a flywheel supported substantially by magnetic bearing force. This minimizes friction in the system. In some embodiments, at least one of ball bearings, balls and smooth protrusions, preferably of ceramic material, provide backup bearing 210 in case some flywheel translation motion does occur.

Magnetic bearings have reduced friction and reduced contact-based component damage compared to other forms of bearings. Therefore in some embodiments, a selective motion transfer mechanism and/or a motion rectifier, of any form, is used to convert multidirectional motion to unidirectional motion, which is then transmitted to a flywheel. Said flywheel further comprises one or more magnets that will interact with one or more magnetic fields from magnets outside of said flywheel, in order to produce forces to support the flywheel to prevent substantial radial translation. In some embodiments, the external magnetic fields may also contribute force to support the flywheel to prevent substantial axial translation. In some embodiments the axial support is provided by axially offsetting the supporting magnets outside of the flywheel with respect to the magnets inside of said flywheel, and providing a physical support in the resulting axial magnetic force direction. In some embodiments, the axial direction stated herein is perpendicular to the radial direction stated herein. In some embodiments, the combination of selective motion transfer and/or motion rectification, and an at least partially magnetically supported flywheel can be used in the context of Ocean Wave Energy and/or a land vehicle generating usable energy while traversing uneven land.

Magnetic teeth refers to at least one of: teeth comprising at least one magnet and teeth that are themselves magnets.

The term erection refers to the action by which a sub-body, such as a tooth or sprag, is brought to an erect state. An erect state is one where the sub-body is able to interface with a source body in a manner in which a movement of the source body in a first direction causes the collapse of the sub-body, while the movement of the source body in a second direction does not cause the collapse of the interacting sub-body. A collapsed state of a sub-body is defined as the state in which the interacting sub-body is unable to effectively transmit motion from the source body to the sink body.

The term "rotationally attached" of a sub-body (tooth) refers to the sub-body being connected with a source or sink body whilst being able to rotate independent of said source or sink body within allowable limits. The word magnet herein refers to any of a permanent magnet, an electromagnet and an induced magnet.

Additional Applications

The present invention may be utilized beyond the scope of wave energy generation, or alongside existing wave energy technologies to increase efficiency and decrease maintenance requirements.

Figure 24:
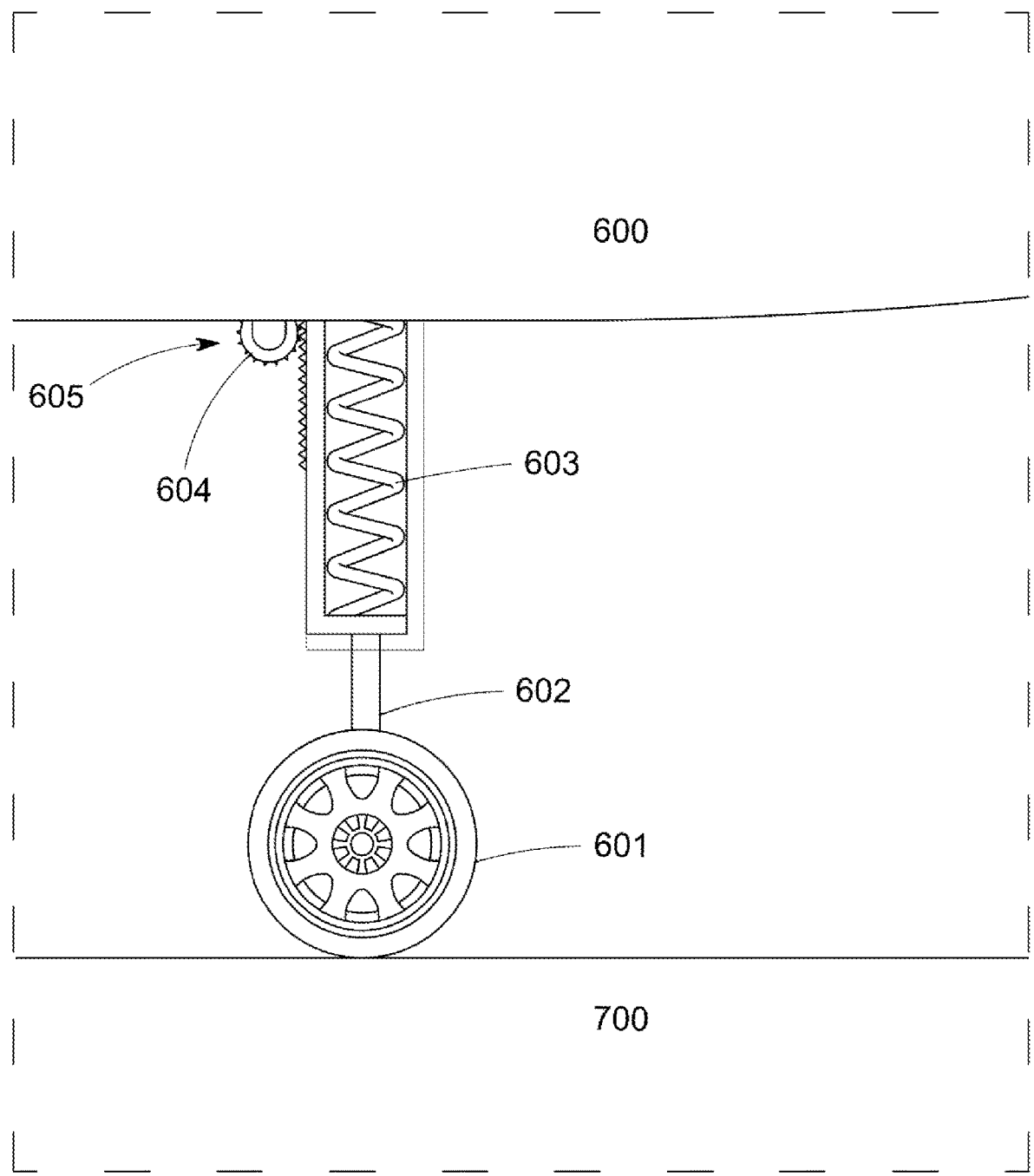
FIG. 24 is a depiction of the use of an ADMC in a land vehicle.

The present invention may be utilized in land vehicles traversing uneven terrain in which bidirectional motion is generated, the invention may be configured as part of a regenerative suspension system and thereby convert kinetic energy from the terrain into electricity. FIG. 24 shows one embodiment of the present invention wherein the source body 604 undergoes bidirectional motion due to vertical perturbations on the road 700 that are transmitted by the wheel 601 via a connection member 602 to said source body 604. 604 may be connected with any of the magnetic rectifier embodiments of this invention.

Figure 25:
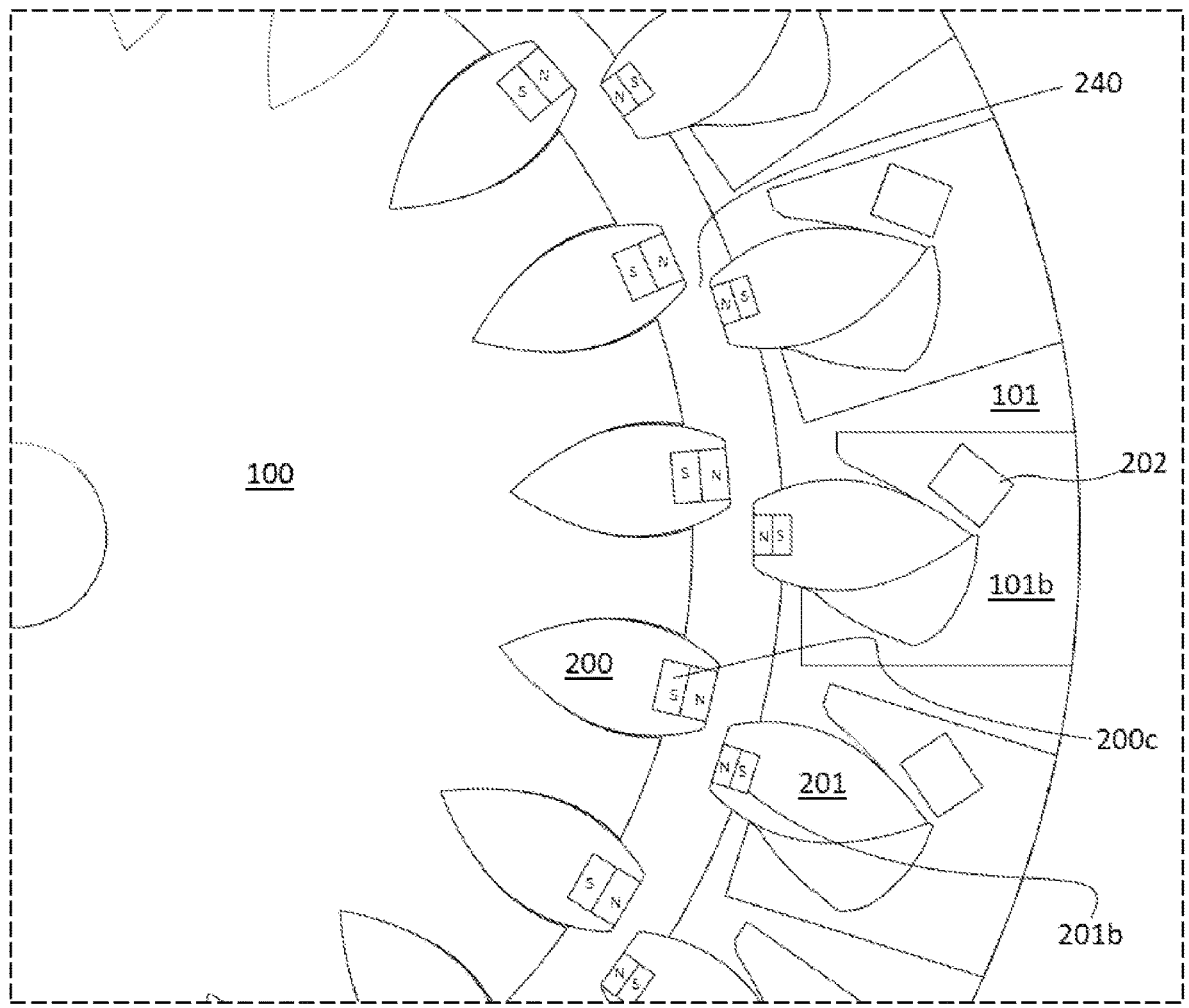
FIG. 25 is a front partial view of one embodiment of the present invention, wherein interacting magnets are aligned radially with respect to the sink body 101, and wherein there is a gap to allow for source and sink slippage incase of an overtorque condition.

Referring to FIG. 25, in some embodiments of the present invention, a gap 240 allows the source body 100 to rotate freely during over torque situations (which commonly occur during irregular wave and/or storm situations), even if the direction of motion of the source body 100 causes the erection of collapsible teeth 201. During normal torque situations, if the collapsible teeth 201 are erect, rigid teeth 200 exert a repulsion force on collapsible teeth 201 to transfer motion to sink body 101 without slippage between source 100 and sink 101 bodies. In some embodiments, as seen in FIG. 25, teeth 200, 201 comprise magnets 200c, 201b with their magnetic fields originating along substantially radial lines with respect to the sink planetary gear body 101, in other words North of said magnets is pointing substantially any of radially outward and radially inward.

Figure 26:
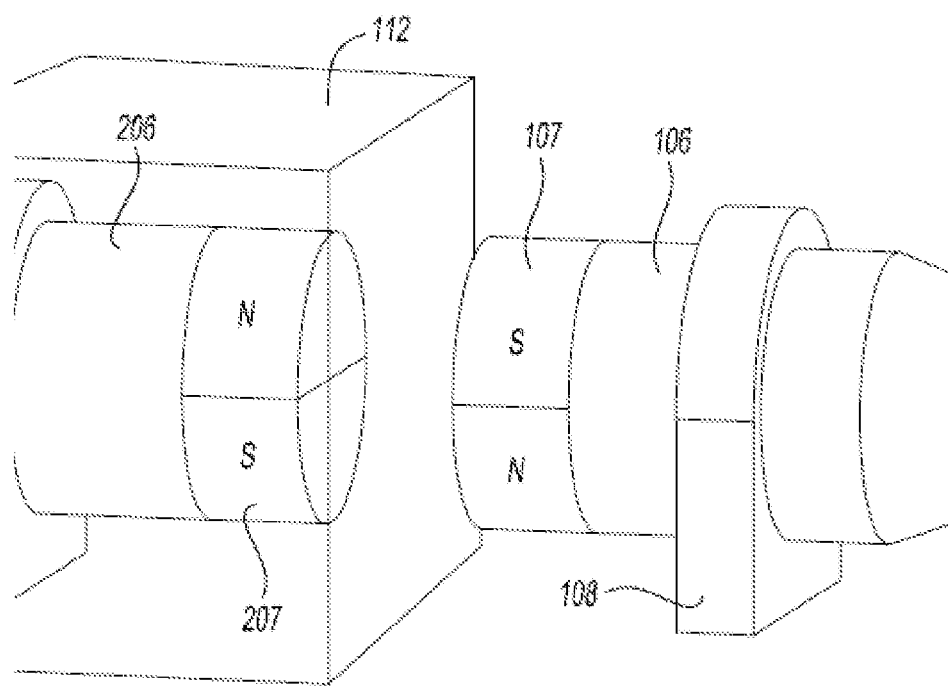
FIG. 26 is a perspective view of an embodiment comprising magnetic axial coupling of two bodies.

Referring to FIG. 26, a source of motion is provided on a body that is magnetically coupled with another body, with said coupling being effective only at a range, of at least one of force and torque, at which each of all the bodies in the system affected by said at least one of torque and force, undergo stress below at least one of: a fatigue endurance limit, a fatigue strength defined at the operational life of the overall system, and a fatigue strength defined at the operational life of the body. In some embodiments, prior to magnetic coupling, the motion is first sped up using a gearbox to adjust the moment range faced by the magnetic coupling. FIG. 26 shows a simple view of magnetic coupling between two bodies 206 and 106, with magnets 207 and 107 facilitating the transfer of motion during a nominal torque range.

I claim:

1. A method of producing unidirectional motion from multidirectional motion for at least one of energy conversion, energy storage and desalination, the method comprising steps of:

providing a source body (100) that can undergo multidirectional motion;

providing a sink body (101);

providing at least one tooth (201, 201b) that, at least in part, forms an interface between the source body and the sink body, with said at least one tooth being physically connected with any one of the source body and the sink body with at least one degree of freedom, and with each of said at least one tooth being able to comprise at least one of an erect state (201—FIG. 1) and a capitulated state (201—FIG. 2);

wherein any of the at least one tooth (201, 201b) comprises a first net magnetic dipole;

providing a second magnetic dipole (202—FIG. 3) physically connect d with the same body that the at least one tooth (201) is connected with;

wherein the first magnetic dipole is any one of a permanent magnet and an induced magnet;

wherein the second magnetic dipole (202) is any one of a permanent magnet and an induced magnet;

wherein an induced magnet is a magnetic dipole that forms due to the presence of at least one permanent magnet in its vicinity, wherein said induced magnet is not an electromagnet;

wherein each of the at least one tooth, if in an erect state, remains erect if a force pushes the tooth in a first direction relative to the tooth (2—FIG. 1);

substantially capitulates when a force pushes the tooth in a second direction relative to the tooth (2—FIG. 2);

wherein a capitulated state is one where the tooth is unable to substantially transfer motion from the source body to the sink body;

wherein each of the at least one tooth, if in a capitulated state, transitions to an erect state when said force, pushing the tooth in the second direction, subsides, wherein said erection is caused by a magnetic force between the first net magnetic dipole and second net magnetic dipole (4—FIG. 3);

wherein the transfer of motion from the source body to the sink body occurs via the at least one tooth that is in an erect state; and transmitting a unidirectional motion from the sink body to at least one of an energy storage apparatus, a hydraulic pump, and an electric generator for the generation of electricity.

2. The method according to claim 1, further comprising the step of providing a third magnetic dipole (200) that applies a magnetic force to the first magnetic dipole (201) to facilitate the transfer of motion from the source body to the sink body (2—FIG. 1), wherein the first magnetic dipole (201) and the third magnetic dipole (200) are permanent magnets.

3. The method of claim 1, wherein at least one such source body and at least one such sink body are configured to convert both directions of an alternating motion to unidirectional motion, effectively functioning as an alternating-to-direct motion converter.

4. The method of claim 1, further providing a buoyant body that is at least partially submerged in a water body, wherein the motion of said buoyant body is at least partially transmitted to said source body.

5. The method of claim 1, further providing magnetic shielding material to prevent unwanted magnetic interferences between components.

6. The method of claim 1, wherein the motion is transferred to a flywheel, and further providing at least partially magnetic bearing forces to support said flywheel.

7. The method of claim 1, wherein the method is applied to convert multidirectional motion, captured by land vehicles traversing uneven terrain, to unidirectional motion for the capture of usable energy.

8. The method of claim 1, wherein the source and sink body form a part of a one-way clutch.

9. The method of claim 2, wherein said first magnetic dipole and the third magnetic dipole comprises poles that are substantially aligned along radial lines with respect to a sink body (200c, 201b—FIG. 23).

10. An apparatus that produces unidirectional motion from multidirectional motion for at least one of energy conversion, energy storage and desalination, the apparatus comprising:
a source body (100) that can undergo multidirectional motion;
a sink body (101);
at least one tooth (201, 201b) that, at least in part, forms an interface between the source body and the sink body, with said at least one tooth being physically connected with any one of the source body and the sink body with at least one degree of freedom, and with each of said at least one tooth being able to comprise at least one of an erect state (201—FIG. 1) and a capitulated state (201—FIG. 2);
wherein any of the at least one tooth (201, 201b) comprises a first net magnetic dipoles;
a second magnetic dipole (202—FIG. 3) physically connected with the same body that the at least one tooth (201) is connected with;
wherein the first magnetic dipole is any one of a permanent magnet and an induced magnet;
wherein the second magnetic dipole (202) is any one of a permanent magnet and an induced magnet;
wherein an induced magnet is a magnetic dipole that forms due to the presence of at least one permanent magnet in its vicinity, wherein said induced magnet is not an electromagnet;
wherein each of the at least one tooth, if in an erect state, remains erect if a force pushes the tooth in a first direction relative to the tooth (2—FIG. 1);
substantially capitulates when a force pushes the tooth in a second direction relative to the tooth (2—FIG. 2);
wherein a capitulated state is one where the tooth is unable to substantially transfer motion from the source body to the sink body;
wherein each of the at least one tooth, if in a capitulated state,
transitions to an erect state when said force, pushing the tooth in the second direction, subsides, wherein said erection is caused by a magnetic force between the first net magnetic dipole and second net magnetic dipole (4—FIG. 3);
wherein the transfer of motion from the source body to the sink body occurs via the at least one tooth that is in an erect state; and
at least one of an energy storage mechanism, a hydraulic pump, and an electric generator for the generation of electricity.

11. The apparatus of claim 10, further comprising a third magnetic dipole (200) that applies a magnetic force to the first magnetic dipole (201) to facilitate the transfer of motion from the source body to the sink body (2—FIG. 1), and wherein the first magnetic dipole (201) and third magnetic dipole are permanent magnets.

12. The apparatus of claim 10, wherein at least one such source body and at least one such sink body are configured to convert both directions of an alternating motion to unidirectional motion, effectively functioning as an alternating-to-direct motion converter.

13. The apparatus of claim 10, further comprising a buoyant body that is at least partially submerged in a water body, wherein the motion of said buoyant body is at least partially transmitted to said source body.

14. The apparatus of claim 10, further comprising magnetic shielding material to prevent magnetic interferences between components.

15. The apparatus of claim 10, wherein the motion is transferred to a flywheel, and further providing at least partially magnetic bearing forces to support said flywheel.

16. The apparatus of claim 10, wherein the apparatus further comprises a land-based vehicle, wherein the multidirectional motion captured from the land based vehicle while traversing uneven land, is transferred to the source body.

17. The apparatus of claim 10, wherein the source and sink body form a part of a one-way clutch.

18. An apparatus that produces unidirectional motion from multidirectional motion for at least one of energy conversion, energy storage and desalination, the apparatus comprising:
a buoyant body (5000) at least partially submerged in a body of water;
a first body (100—FIG. 4);
a second body (101—FIG. 4);
wherein any of said first body and second body is configured to undergo substantially multidirectional motion;
at least one sub-body (201—FIG. 4) that is connected with said first body in a manner to allow an at least one degree of freedom of the sub-body with respect to the first body;

wherein each of the at least one sub-body (201) comprises a greater physical limitation on one side of said sub-body (203) compared to the opposite side of said sub-body;

wherein each of the at least one sub-body
  collapses when pushed in a first direction relative to the sub-body; and
  remains erect when pushed in a second direction relative to the sub-body;

wherein the at least one sub-body comprises a first magnetic body;

a second magnetic body (202—FIG. 3) composed in the first body that interacts with the first magnetic body of any of the at least one sub-body to erect the sub-body from a collapsed state to an erect state; and at least one of an energy storage mechanism, a hydraulic pump, and an electric generator for the generation of electricity, that receives substantially unidirectional motion.

19. The apparatus of claim 11, wherein said first magnetic dipole and the third magnetic dipole comprises poles that are substantially aligned along radial lines with respect to a sink body (200c, 201b—FIG. 25).

20. A method according to claim 9, wherein during the direction of source motion that does not cause capitulation of the at least one tooth, a torque that is applied to the source body that exceeds a threshold, will cause the source body to move independently from the sink body, thereby avoiding the transfer high loads from the source body to the sink body.

21. An apparatus according to claim 19, wherein during the direction of source motion that does not cause capitulation of the at least one tooth, a torque that is applied to the source body that exceeds a threshold, will cause the source body to move independently from the sink body, thereby avoiding the transfer high loads from the source body to the sink body.

* * * * *